US009441565B2

United States Patent
Kubo et al.

(10) Patent No.: US 9,441,565 B2
(45) Date of Patent: Sep. 13, 2016

(54) ABNORMALITY DIAGNOSIS SYSTEM OF INTERNAL COMBUSTION ENGINE

(71) Applicant: Toyota Jidosha Kabushiki Kaisha, Toyota-shi, Aichi-ken (JP)

(72) Inventors: Masahiro Kubo, Susono (JP); Yasushi Iwasaki, Ebina (JP); Kouichi Kitaura, Odawara (JP); Hiroshi Miyamoto, Sizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/504,516

(22) Filed: Oct. 2, 2014

(65) Prior Publication Data

US 2015/0089927 A1 Apr. 2, 2015

(30) Foreign Application Priority Data

Oct. 2, 2013 (JP) .................. 2013-207666

(51) Int. Cl.
*F01N 3/00* (2006.01)
*F02D 41/14* (2006.01)
(Continued)

(52) U.S. Cl.
CPC ......... *F02D 41/1441* (2013.01); *F01N 3/0864* (2013.01); *F01N 3/101* (2013.01); *F01N 11/007* (2013.01); *F02D 41/1454* (2013.01); *F02D 41/1495* (2013.01); *F01N 2550/03* (2013.01); *F01N 2560/025* (2013.01); *F01N 2560/14* (2013.01); *F01N 2900/1624* (2013.01); *F02D 41/1475* (2013.01); *F02D 41/22* (2013.01); *Y02T 10/22* (2013.01); *Y02T 10/47* (2013.01)

(58) Field of Classification Search
CPC .. F01N 3/0842; F01N 13/02; F02D 41/0275; F02D 41/1441; F02D 41/0295
USPC .............. 60/273, 274, 285, 286, 299, 301; 701/114.75
See application file for complete search history.

(56) References Cited

U.S. PATENT DOCUMENTS 5,416,710 A * 5/1995 Kuroda ................ F01N 11/002
60/274
6,244,046 B1 * 6/2001 Yamashita ............ F01N 3/0842
60/276

(Continued)

FOREIGN PATENT DOCUMENTS

JP 2002-130018 A 5/2002
JP 2002130018 A * 5/2002

(Continued)

*Primary Examiner* — Patrick Maines
(74) *Attorney, Agent, or Firm* — Dinsmore & Shohl LLP

(57) ABSTRACT

An internal combustion engine comprises an exhaust purification catalyst which can store oxygen, controller for controlling the air-fuel ratio of exhaust gas to become a target air-fuel ratio, and a downstream side air-fuel ratio sensor. An abnormality diagnosis system performs an active air-fuel ratio control which alternately controls the target air-fuel ratio to rich and lean air-fuel ratios, and diagnoses abnormality of said exhaust purification catalyst based on the output air-fuel ratio of the air-fuel ratio sensor. The abnormality diagnosis system judges that the exhaust purification catalyst is abnormal when the output air-fuel ratio of the air-fuel ratio sensor reaches a rich judgment air-fuel ratio and a lean judgment air-fuel ratio during the active air-fuel ratio control, and judges that said air-fuel ratio control is abnormal when the output air-fuel ratio reaches only one of the rich and lean judgment air-fuel ratios.

20 Claims, 11 Drawing Sheets

(51) Int. Cl.
*F01N 11/00* (2006.01)
*F01N 3/10* (2006.01)
*F01N 3/08* (2006.01)
*F02D 41/22* (2006.01)

(56) References Cited

U.S. PATENT DOCUMENTS

| | | | | |
|---|---|---|---|---|
| 2005/0150208 A1* | 7/2005 | Uchida | F02D 41/0295 | 60/277 |
| 2007/0095051 A1* | 5/2007 | Iihoshi | F01N 11/007 | 60/277 |
| 2007/0220862 A1* | 9/2007 | Suehiro | F01N 3/101 | 60/277 |
| 2007/0227121 A1* | 10/2007 | Iida | F01N 3/101 | 60/276 |
| 2007/0227123 A1* | 10/2007 | Iida | F01N 3/101 | 60/277 |
| 2007/0277504 A1* | 12/2007 | Ishikawa | F01N 11/007 | 60/277 |
| 2008/0066727 A1* | 3/2008 | Kato | F02D 41/2461 | 123/703 |
| 2015/0086428 A1* | 3/2015 | Kitaura | F01N 11/007 | 422/119 |

FOREIGN PATENT DOCUMENTS

| | | | | |
|---|---|---|---|---|
| JP | 2005-180201 | A | | 7/2005 |
| JP | 2005-194981 | A | | 7/2005 |
| JP | 2005194981 | A | * | 7/2005 |
| JP | 2007-126982 | A | | 5/2007 |
| JP | 2007126982 | A | * | 5/2007 |
| JP | 2007-278075 | A | | 10/2007 |
| JP | 2007-278076 | A | | 10/2007 |
| JP | 2007-285288 | A | | 11/2007 |
| JP | 2008-063995 | A | | 3/2008 |
| JP | 2008-075495 | A | | 4/2008 |
| JP | 2010-138791 | A | | 6/2010 |
| JP | 2010138791 | A | * | 6/2010 |
| JP | 2011231626 | A | * | 11/2011 |

* cited by examiner

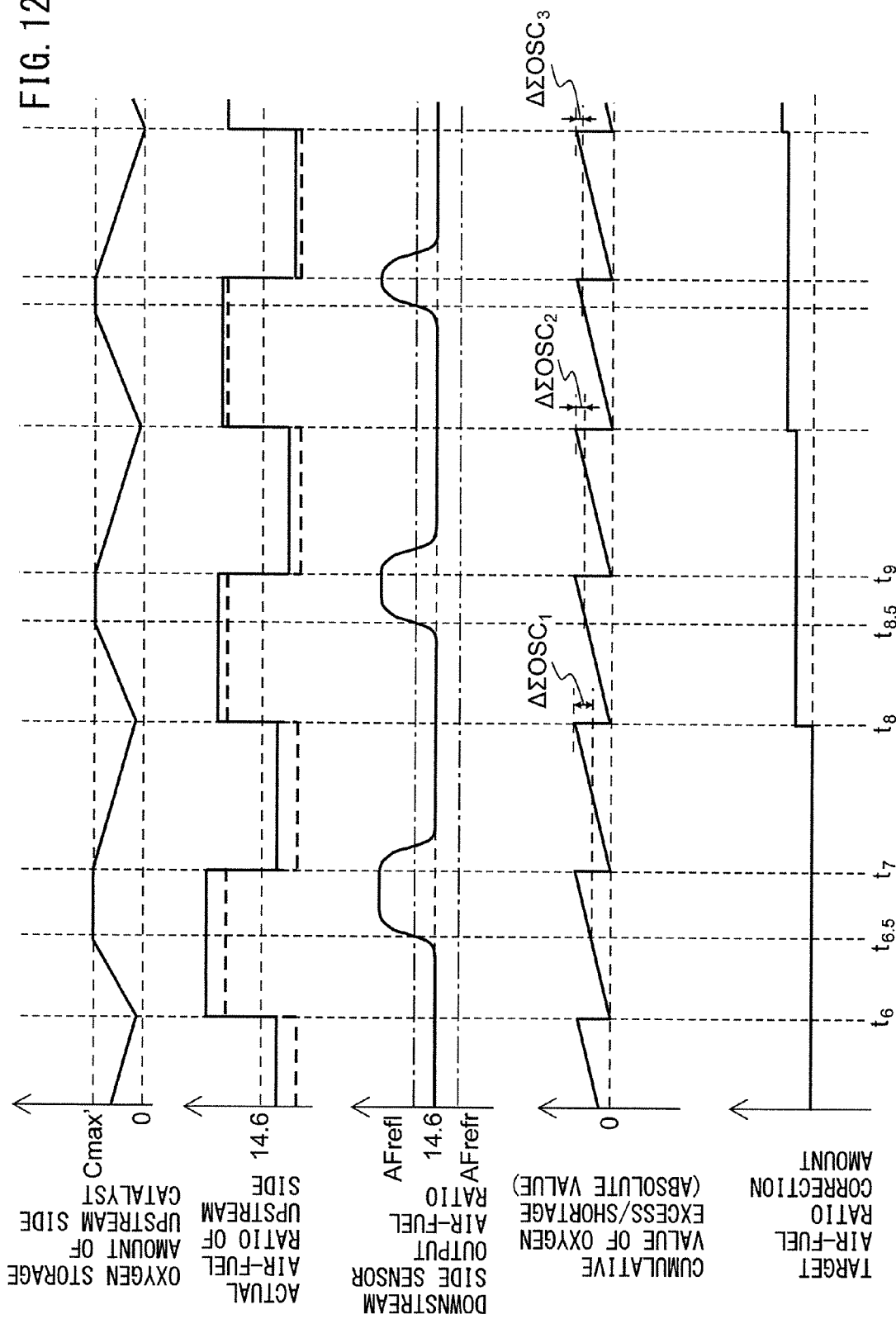

ABNORMALITY DIAGNOSIS SYSTEM OF INTERNAL COMBUSTION ENGINE

TECHNICAL FIELD

The present invention relates to an abnormality diagnosis system of an internal combustion engine.

BACKGROUND ART

In general, an exhaust passage of an internal combustion engine is provided with an exhaust purification catalyst for purifying exhaust gas which is exhausted from the internal combustion engine. As such an exhaust purification catalyst, for example, an exhaust purification catalyst which has an oxygen storage ability is used. An exhaust purification catalyst which has an oxygen storage ability can remove the unburned gas (HC or CO etc.) or $NO_X$ etc. in the exhaust gas which flows into the exhaust purification catalyst when the oxygen storage amount is a suitable amount which is smaller than a maximum storable oxygen amount (maximum amount of oxygen which can be stored by exhaust purification catalyst). That is, if exhaust gas of an air-fuel ratio which is richer than the stoichiometric air-fuel ratio (below, also referred to as a "rich air-fuel ratio") flows into the exhaust purification catalyst, the oxygen which is stored in the exhaust purification catalyst enables the unburned gas in the exhaust gas to be removed by oxidation. On the other hand, if exhaust gas of an air-fuel ratio which is leaner than the stoichiometric air-fuel ratio (below, also referred to as a "lean air-fuel ratio") flows into the exhaust purification catalyst, the oxygen in the exhaust gas is stored in the exhaust purification catalyst. Due to this, the surface of the exhaust purification catalyst becomes an oxygen-deficient state. Along with this, the $NO_X$ in the exhaust gas is removed by reduction. As a result, the exhaust purification catalyst can purify the exhaust gas regardless of the air-fuel ratio of the exhaust gas which flows into the exhaust purification catalyst so long as the oxygen storage amount is a suitable amount.

In this regard, the exhaust purification catalyst deteriorates as the length of use becomes longer. It is known that if the exhaust purification catalyst deteriorates in this way, along with this, the exhaust purification catalyst deteriorates in the maximum storable oxygen amount. For this reason, by detecting the maximum storable oxygen amount of the exhaust purification catalyst, it is possible to detect the degree of deterioration of the exhaust purification catalyst. As such a method of detection of the maximum storable oxygen amount, for example, it is known to perform active air-fuel ratio control which periodically switches the target air-fuel ratio of the exhaust gas which flows into the exhaust purification catalyst between the rich air-fuel ratio and the lean air-fuel ratio. In this method, the output during performance of the active air-fuel ratio control of the oxygen sensor which is provided at the downstream side in the exhaust flow direction of the exhaust purification catalyst is used as the basis to diagnose deterioration of the exhaust purification catalyst.

For example, in the abnormality diagnosis system which is described in PLT 1, in the period when the target air-fuel ratio is set to the rich air-fuel ratio or lean air-fuel ratio, the period of the active air-fuel ratio control is set so that the cumulative value of the amount of unburned gas or the amount of oxygen in the exhaust gas which flows into the exhaust purification catalyst becomes an amount between the maximum storable oxygen amount (breakthrough amount) when the exhaust purification catalyst is normal (when the degree of deterioration is small) and the maximum storable oxygen amount when the degree of deterioration of the exhaust purification catalyst is large. Further, when the output of the downstream side oxygen sensor greatly swings, it is judged that the exhaust purification catalyst has deteriorated, while when the swing is small, it is judged that the exhaust purification catalyst has not deteriorated.

CITATIONS LIST

Patent Literature

PLT 1: Japanese Patent Publication No. 2002-130018A
PLT 2: Japanese Patent Publication No. 2007-278075A
PLT 3: Japanese Patent Publication No. 2007-285288A

SUMMARY OF INVENTION

Technical Problem

In this regard, in general, the air-fuel ratio of the exhaust gas which flows into the exhaust purification catalyst is feedback controlled to become the target air-fuel ratio based on the output of the upstream direction air-fuel ratio sensor which is provided at the upstream side of the exhaust purification catalyst in the exhaust flow direction. For this reason, when the output air-fuel ratio of the upstream direction air-fuel ratio sensor deviates with respect to the actual air-fuel ratio, even if performing feedback control as explained above, the actual air-fuel ratio of the exhaust gas which flows into the exhaust purification catalyst ends up deviating from the target air-fuel ratio. In this way, if an abnormality occurs in the air-fuel ratio control means for controlling the exhaust gas which flows into the exhaust purification catalyst to become the target air-fuel ratio, it is no longer possible to use the abnormality diagnosis system to suitably diagnose deterioration of the exhaust purification catalyst.

For example, in the abnormality diagnosis system which is described in PLT 1, when the exhaust purification catalyst is normal, the output of the downstream side oxygen sensor is maintained at a value which corresponds to either of the rich air-fuel ratio and the lean air-fuel ratio. That is, when the exhaust purification catalyst is normal, the air-fuel ratio of the exhaust gas which is discharged from the exhaust purification catalyst becomes substantially the stoichiometric air-fuel ratio. However, there is hysteresis in the oxygen sensor, unless the actual air-fuel ratio of exhaust gas changes from the rich air-fuel ratio to the lean air-fuel ratio or from the lean air-fuel ratio to the rich air-fuel ratio, the output also will not change. As a result, even if the air-fuel ratio of the exhaust gas which is discharged from the exhaust purification catalyst becomes substantially the stoichiometric air-fuel ratio, the output of the oxygen sensor is maintained at a value which corresponds to either the rich air-fuel ratio or lean air-fuel ratio. Therefore, in the abnormality diagnosis system which is described in PLT 1, the output of the oxygen sensor is maintained at a value which corresponds to either of the rich air-fuel ratio or lean air-fuel ratio. When the fluctuation in output is small, it is judged that the exhaust purification catalyst is normal.

In this regard, if an abnormality occurs in the air-fuel ratio control means for controlling the exhaust gas which flows into the exhaust purification catalyst to become the target air-fuel ratio, even if the exhaust purification catalyst has deteriorated, sometimes the output of the downstream side oxygen sensor will be maintained at a value which corresponds to either of the rich air-fuel ratio or lean air-fuel ratio. For example, when the output air-fuel ratio of the upstream direction air-fuel ratio sensor deviates from the actual air-fuel ratio to the rich side, in active air-fuel ratio control, the actual air-fuel ratio of the exhaust gas becomes leaner than the target air-fuel ratio. As a result, in active air-fuel ratio control, when the target air-fuel ratio is made the rich air-fuel ratio, exhaust gas of a rich air-fuel ratio with an actual degree of richness lower than the one envisioned flows into the exhaust purification catalyst.

In this case, even if the exhaust purification catalyst deteriorates and the maximum storable oxygen amount becomes smaller, the oxygen storage amount of the exhaust purification catalyst no longer decreases to zero and, as a result, exhaust gas of a rich air-fuel ratio no longer flows out from the exhaust purification catalyst. In this way, if exhaust gas of the rich air-fuel ratio no longer flows out from the exhaust purification catalyst, the output of the oxygen sensor is maintained at a value which corresponds to the lean air-fuel ratio and therefore the fluctuation of the output of the oxygen sensor ends up becoming smaller. That is, despite the exhaust purification catalyst deteriorating, it ends up being judged that the exhaust purification catalyst is normal.

Therefore, in consideration of the above problem, an object of the present invention is to provide an abnormality diagnosis system which can accurately diagnose an abnormality of an exhaust purification catalyst.

Solution to Problem

To solve this problem, in the first aspect of the invention, there is provided an abnormality diagnosis system of an internal combustion engine, which internal combustion engine comprises an exhaust purification catalyst which is arranged in an exhaust passage of the internal combustion engine and which can store oxygen, a controller for controlling the air-fuel ratio of exhaust gas flowing into the exhaust purification catalyst to become a target air-fuel ratio, and a downstream side air-fuel ratio sensor which is arranged at a downstream side of said exhaust purification catalyst in an exhaust flow direction and which can detect an air-fuel ratio of exhaust gas discharged from said exhaust purification catalyst,
wherein the abnormality diagnosis system of an internal combustion engine performs active air-fuel ratio control which alternately controls said target air-fuel ratio to a rich air-fuel ratio which is richer than a stoichiometric air-fuel ratio and a lean air-fuel ratio which is leaner than the stoichiometric air-fuel ratio at a given interval, and diagnoses abnormality of said exhaust purification catalyst based on the output air-fuel ratio of the downstream side air-fuel ratio sensor during execution of said active air-fuel ratio control, and
wherein said abnormality diagnoses system judges that said exhaust purification catalyst is abnormal when the output air-fuel ratio of the downstream side air-fuel ratio sensor reaches a rich judgment air-fuel ratio which is richer than the stoichiometric air-fuel ratio or less, and a lean judgment air-fuel ratio which is leaner than the stoichiometric air-fuel ratio or more in the period where said target air-fuel ratio is successively made the rich air-fuel ratio and lean air-fuel ratio due to said active air-fuel ratio control, and
judges that said air-fuel ratio control by said controller is abnormal when the output air-fuel ratio of the downstream side air-fuel ratio sensor reaches only one of said rich judgment air-fuel ratio or less or said lean judgment air-fuel ratio or more in the period where said target air-fuel ratio is successively made the rich air-fuel ratio and lean air-fuel ratio due to said active air-fuel ratio control.

In a second aspect of the invention, there is provided the first aspect of the invention wherein said abnormality diagnosis system judges that said exhaust purification catalyst is not abnormal when the output air-fuel ratio of the downstream side air-fuel ratio sensor is maintained in a range which is leaner than the rich judgment air-fuel ratio and richer than said lean judgment air-fuel ratio in the period where said target air-fuel ratio is successively made the rich air-fuel ratio and lean air-fuel ratio due to said active air-fuel ratio control.

In a third aspect of the invention, there is provided the first or second aspect of the invention wherein said abnormality diagnosis system suspends diagnosis of abnormality of said exhaust purification catalyst when it is judged that said air-fuel ratio control by said controller is abnormal.

In a fourth aspect of the invention, there is provided any one of the first to third aspects of the invention wherein said abnormality diagnosis system suspends said active air-fuel ratio control when it is judged that said air-fuel ratio control by said controller has become abnormal.

In a fifth aspect of the invention, there is provided any one of the first to fourth aspects of the invention wherein the internal combustion engine further comprises an upstream side air-fuel ratio sensor which is arranged at an upstream side of said exhaust purification catalyst in the exhaust flow direction and which can detect the air-fuel ratio of the exhaust gas flowing into the exhaust purification catalyst, and the controller calculates, based on the output air-fuel ratio of the upstream direction air-fuel ratio sensor, the amount of oxygen which is in excess or the amount of oxygen which becomes insufficient when trying to make the air-fuel ratio of the exhaust gas flowing into the exhaust purification catalyst the stoichiometric air-fuel ratio as an oxygen excess/shortage, and said given interval is an interval from when switching said target air-fuel ratio from the rich air-fuel ratio to the lean air-fuel ratio or from the lean air-fuel ratio to the rich air-fuel ratio to when the absolute value of the cumulative oxygen excess/shortage which is cumulatively added by the controller becomes a predetermined amount.

In a sixth aspect of the invention, there is provided the fifth aspect of the invention wherein the controller can correct the output air-fuel ratio of the upstream direction air-fuel ratio sensor or target air-fuel ratio, and corrects said output air-fuel ratio of the upstream direction air-fuel ratio sensor or said target air-fuel ratio when said abnormality diagnosis system judges that said air-fuel ratio control by said controller is abnormal.

In a seventh aspect of the invention, there is provided the sixth aspect of the invention wherein said controller corrects the target air-fuel ratio or said output air-fuel ratio of the downstream side air-fuel ratio sensor to the lean side when the output air-fuel ratio of the downstream side air-fuel ratio sensor reaches only said rich judgment air-fuel ratio or less in the period where said target air-fuel ratio is successively made the rich air-fuel ratio and lean air-fuel ratio due to said active air-fuel ratio control and corrects the target air-fuel ratio or said output air-fuel ratio of the downstream side air-fuel ratio sensor to the rich side when said output air-fuel ratio of the downstream side air-fuel ratio sensor reaches only said lean judgment air-fuel ratio or more.

In a eighth aspect of the invention, there is provided sixth aspect of the invention wherein said controller corrects said output air-fuel ratio of the upstream direction air-fuel ratio sensor or said target air-fuel ratio so that a difference becomes smaller between the absolute value of the cumulative oxygen excess/shortage which is cumulatively added by the controller from when said target air-fuel ratio is switched from the rich air-fuel ratio to the lean air-fuel ratio then again is switched to the rich air-fuel ratio or said output air-fuel ratio of the downstream side air-fuel ratio sensor becomes the lean judgment air-fuel ratio or more and the absolute value of the cumulative oxygen excess/shortage which is cumulatively added by the controller from when said target air-fuel ratio is switched from the lean air-fuel ratio to the rich air-fuel ratio then is again switched to the lean air-fuel ratio or said output air-fuel ratio of the downstream side air-fuel ratio sensor becomes the rich judgment air-fuel ratio or less.

In a ninth aspect of the invention, there is provided any one of the first to eighth aspects of the invention wherein said the downstream side air-fuel ratio sensor is a limit current type air-fuel ratio sensor.

Advantageous Effects of Invention

According to the present invention, there is provided an abnormality diagnosis system which can accurately diagnose an abnormality of an exhaust purification catalyst while taking into consideration the occurrence of an abnormality in an air-fuel ratio control means for controlling the exhaust gas which flows into the exhaust purification catalyst to become a target air-fuel ratio.

BRIEF DESCRIPTION OF DRAWINGS

FIG. 12 is a time chart of the oxygen storage amount etc. when performing active air-fuel ratio control

DESCRIPTION OF EMBODIMENTS

Figure 1:
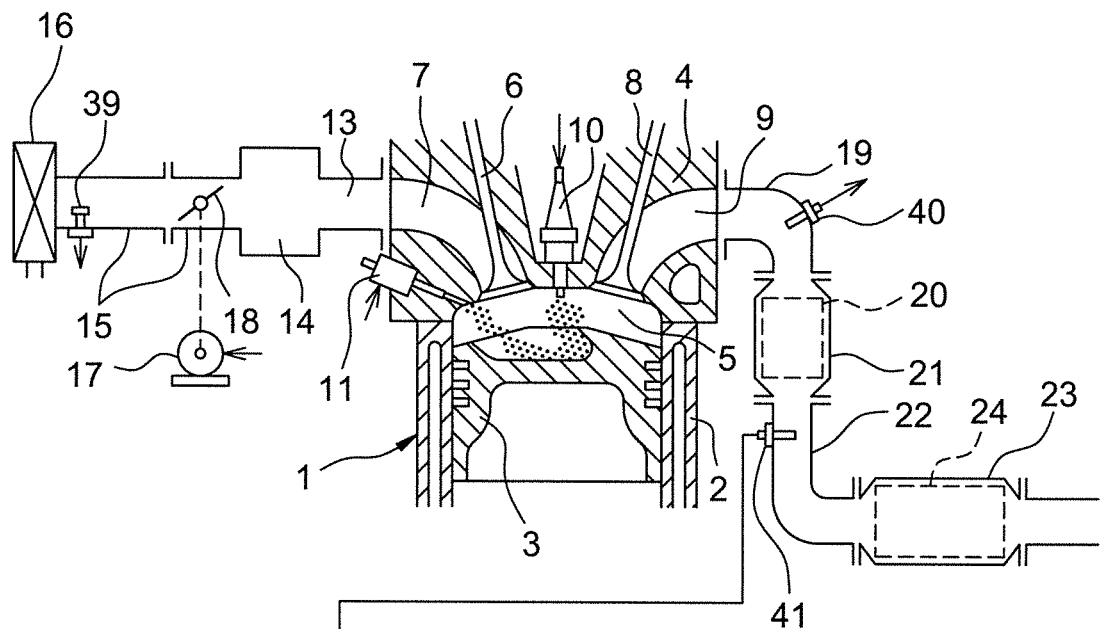
FIG. 1 is a view which schematically shows an internal combustion engine in which an abnormality diagnosis device of the first embodiment of the present invention is used.
Figure 1:
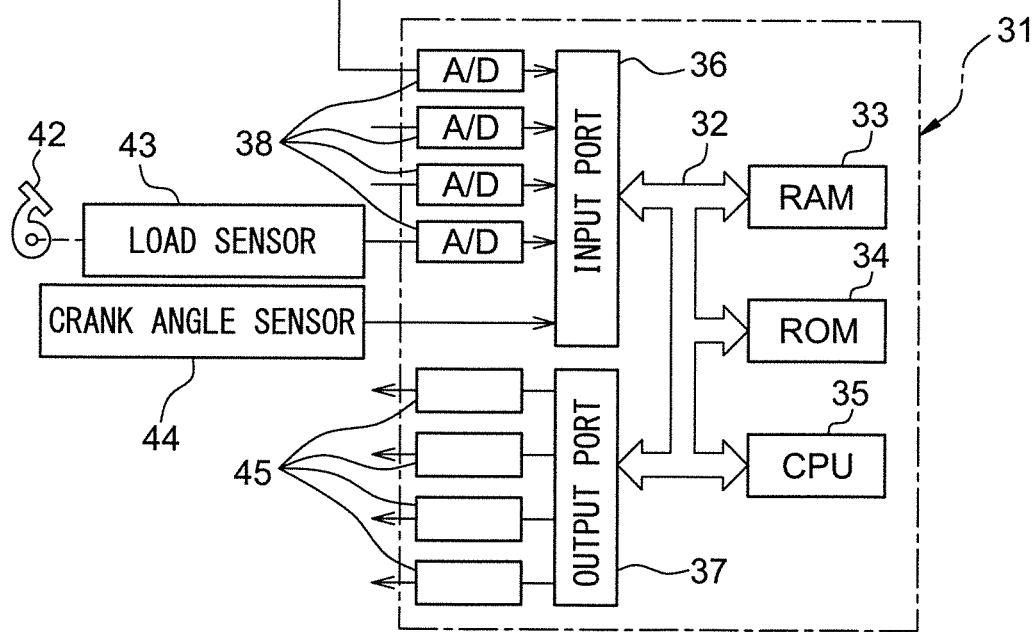

Below, referring to the drawings, an embodiment of an internal combustion engine of the present invention will be explained in detail. Note that, in the following explanation, similar component elements are assigned the same reference numerals.

<Explanation of Internal Combustion Engine as a Whole>

FIG. 1 is a view which schematically shows an internal combustion engine in which an abnormity diagnosis device according to a first embodiment of the present invention is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine using the diagnosis device of the present invention may also use another fuel.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as an abnormality diagnosis device (means) for diagnosing abnormality of the internal combustion engine (in particular, the upstream side exhaust purification catalyst 20 and the upstream air-fuel ratio sensor 40), an air-fuel ratio control device (means) for the exhaust gas flowing into the upstream exhaust purification catalyst 20, and a target air-fuel ratio control device (means) for controlling a target air-fuel ratio explained below.

<Explanation of Exhaust Purification Catalyst>

The upstream side exhaust purification catalyst 20 and downstream side exhaust purification catalyst 24 in each case have similar configurations. Although the upstream side exhaust purification catalyst 20 will be explained below, the upstream side exhaust purification catalyst 24 has similar configurations and functions.

The upstream side exhaust purification catalyst 20 is three-way catalysts which have oxygen storage abilities. Specifically, the upstream side exhaust purification catalyst 20 are comprised of carriers which are comprised of ceramic on which a precious metal which has a catalytic action (for example, platinum (Pt)) and a substance which has an oxygen storage ability (for example, ceria ($CeO_2$)) are carried. The upstream side exhaust purification catalyst 20 exhibits a catalytic action of simultaneously removing unburned gas (HC, CO, etc.) and nitrogen oxides ($NO_X$) when reaching a predetermined activation temperature and, in addition, an oxygen storage ability.

According to the oxygen storage ability of the upstream side exhaust purification catalyst 20, the upstream side exhaust purification catalyst 20 stores the oxygen in the exhaust gas when the air-fuel ratio of the exhaust gas which flows into the upstream side exhaust purification catalyst 20 is leaner than the stoichiometric air-fuel ratio (lean air-fuel ratio). On the other hand, the upstream side exhaust purification catalyst 20 releases the oxygen which is stored in the upstream side exhaust purification catalyst 20 when the inflowing exhaust gas has an air-fuel ratio which is richer than the stoichiometric air-fuel ratio (rich air-fuel ratio).

Figure 2A:
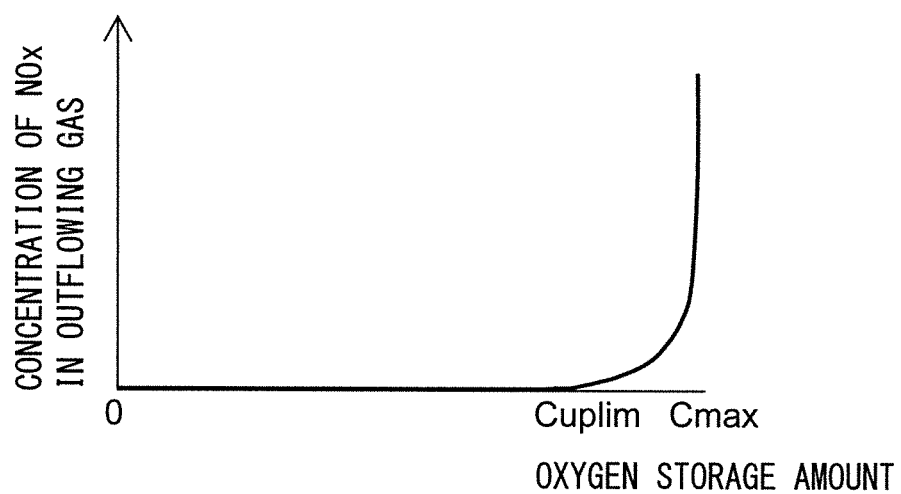
FIG. 2A is a view which shows the relationship between the stored amount of oxygen of the upstream side exhaust purification catalyst and concentration of components in the exhaust gas which flows out from the exhaust purification catalyst.

The upstream side exhaust purification catalyst 20 has a catalytic action and oxygen storage ability and thereby have the action of removing $NO_X$ and unburned gas according to the stored amount of oxygen. That is, as shown in FIG. 2A, when the air-fuel ratio of the exhaust gas which flows into the upstream side exhaust purification catalyst 20 is a lean air-fuel ratio, when the stored amount of oxygen is small, the upstream side exhaust purification catalyst 20 stores the oxygen in the exhaust gas, and thus the $NO_X$ is removed by reduction. Further, if the stored amount of oxygen becomes larger, the exhaust gas which flows out from the exhaust purification catalyst 20 rapidly rises in concentration of oxygen and $NO_X$ at a certain stored amount near the maximum storable oxygen amount Cmax (in the figure, Cuplim).

Figure 2B:
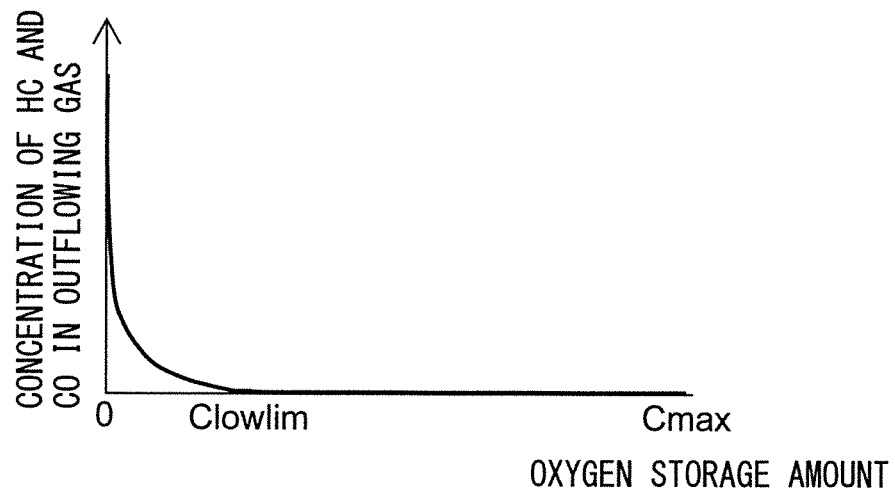
FIG. 2B is a view which shows the relationship between the stored amount of oxygen of the upstream side exhaust purification catalyst and concentration of components in the exhaust gas which flows out from the exhaust purification catalyst.

On the other hand, as shown in FIG. 2B, when the air-fuel ratio of the exhaust gas which flows into the upstream side exhaust purification catalyst 20 is the rich air-fuel ratio, when the stored amount of oxygen is large, the oxygen which is stored in the upstream side exhaust purification catalyst 20 is released, and the unburned gas in the exhaust gas is removed by oxidation. Further, if the stored amount of oxygen becomes small, the exhaust gas which flows out from the exhaust purification catalyst rapidly rises in concentration of unburned gas at a certain stored amount near zero (in the figure, Clowlim).

In the above way, according to the exhaust purification catalysts 20 and 24 which are used in the present embodiment, the characteristics of removal of $NO_X$ and unburned gas in the exhaust gas change depending on the air-fuel ratio and stored amount of oxygen of the exhaust gas which flows into the exhaust purification catalysts 20 and 24. Note that, if having a catalytic action and oxygen storage ability, the exhaust purification catalysts 20 and 24 may also be catalysts different from three-way catalysts.

<Configuration of Air-Fuel Ratio Sensor>

Figure 3:
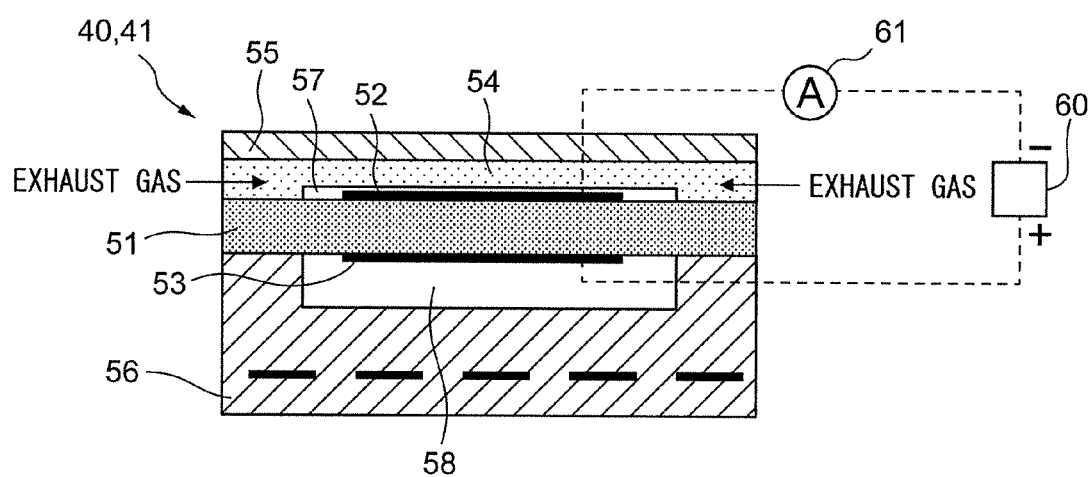
FIG. 3 is a schematic cross-sectional view of an air-fuel ratio sensor.

Next, referring to FIG. 3, the configurations of air-fuel ratio sensors 40 and 41 in the present embodiment will be explained. FIG. 3 is a schematic cross-sectional view of air-fuel ratio sensors 40 and 41. As will be understood from FIG. 3, the air-fuel ratio sensors 40 and 41 in the present embodiment are single-cell type air-fuel ratio sensors each comprised of a solid electrolyte layer and a pair of electrodes forming a single cell.

As shown in FIG. 3, each of the air-fuel ratio sensors 40 and 41 is provided with a solid electrolyte layer 51, an exhaust side electrode (first electrode) 52 which is arranged at one side surface of the solid electrolyte layer 51, an atmosphere side electrode (second electrode) 53 which is arranged at the other side surface of the solid electrolyte layer 51, a diffusion regulation layer 54 which regulates the diffusion of the passing exhaust gas, a protective layer 55 which protects the diffusion regulation layer 54, and a heater part 56 which heats the air-fuel ratio sensor 40 or 41.

On one side surface of the solid electrolyte layer 51, a diffusion regulation layer 54 is provided. On the side surface of the diffusion regulation layer 54 at the opposite side from the side surface of the solid electrolyte layer 51 side, a protective layer 55 is provided. In the present embodiment, a measured gas chamber 57 is formed between the solid electrolyte layer 51 and the diffusion regulation layer 54. Further, the exhaust side electrode 52 is arranged inside the measured gas chamber 57, and the exhaust gas is introduced through the diffusion regulation layer 54 into the measured gas chamber 57. On the other side surface of the solid electrolyte layer 51, the heater part 56 is provided. Between the solid electrolyte layer 51 and the heater part 56, a reference gas chamber 58 is formed. Inside this reference gas chamber 58, a reference gas (for example, atmospheric gas) is introduced. The atmosphere side electrode 53 is arranged inside the reference gas chamber 58.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 is formed by platinum or other precious metal with a high catalytic activity.

Further, between the exhaust side electrode 52 and the atmosphere side electrode 53, sensor voltage Vr is supplied by the voltage supply device 60 which is mounted on the ECU 31. In addition, the ECU 31 is provided with a current detection device 61 which detects the current which flows between these electrodes 52 and 53 through the solid electrolyte layer 51 when the voltage supply device 60 supplies the sensor voltage Vr. The current which is detected by this current detection device 61 is the output current of the air-fuel ratio sensors 40 and 41.

Figure 4:
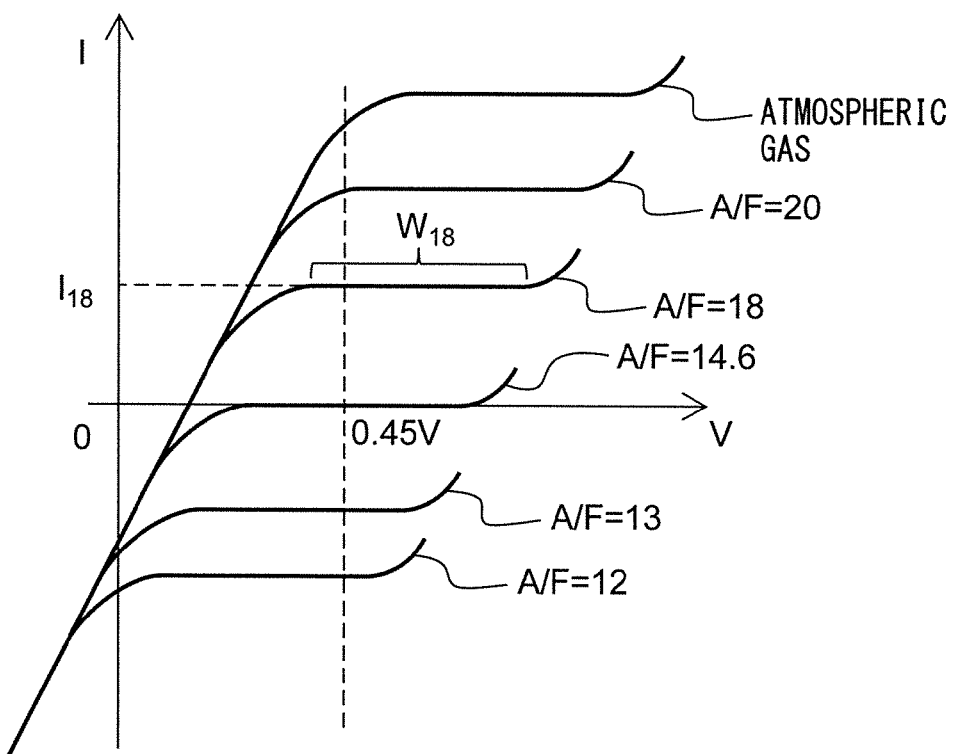
FIG. 4 is a view which shows the relationship between the voltage supplied to the sensor and output current at different exhaust air-fuel ratios.

The thus configured air-fuel ratio sensors 40 and 41 have the voltage-current (V-I) characteristic such as shown in FIG. 4. As will be understood from FIG. 4, the output current I becomes larger the higher the exhaust air-fuel ratio (the leaner). Further, at the line V-I of each exhaust air-fuel ratio, there is a region parallel to the V axis, that is, a region where the output current does not change much at all even if the sensor voltage changes. This voltage region is called the "limit current region". The current at this time is called the "limit current". In FIG. 4, the limit current region and limit current when the exhaust air-fuel ratio is 18 are shown by $W_{18}$ and $I_{18}$.

Figure 5:
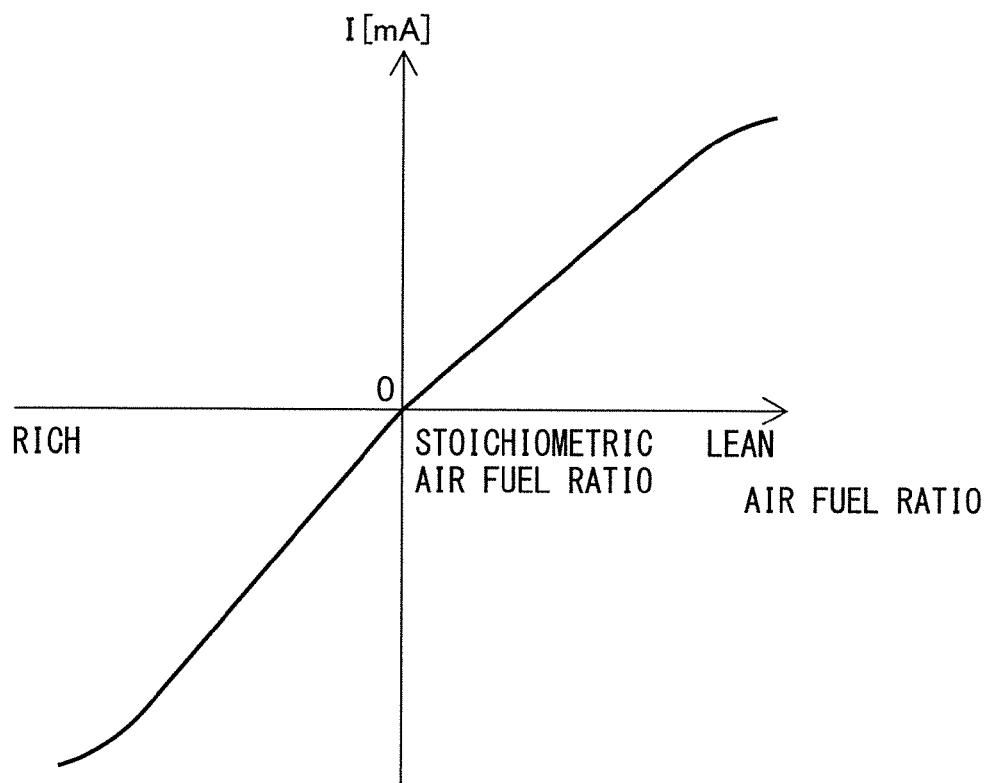
FIG. 5 is a view which shows the relationship between the exhaust air-fuel ratio and output current when making the voltage supplied to the sensor constant.

FIG. 5 is a view which shows the relationship between the exhaust air-fuel ratio and the output current I when making the supplied voltage constant at about 0.45V. As will be understood from FIG. 5, in the air-fuel ratio sensors 40 and 41, the higher the exhaust air-fuel ratio (that is, the leaner), the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Further, when the exhaust air-fuel ratio becomes larger by a certain extent or more or when it becomes smaller by a certain extent or more, the ratio of change of the output current to the change of the exhaust air-fuel ratio becomes smaller.

Note that, in the above example, as the air-fuel ratio sensors 40 and 41, limit current type air-fuel ratio sensors of the structure which is shown in FIG. 3 are used. However, as the upstream side air-fuel ratio sensor 40, for example, it is also possible to use a cup-type limit current type air-fuel ratio sensor or other structure of limit current type air-fuel ratio sensor or air-fuel ratio sensor not a limit current type or any other air-fuel ratio sensor.

Basic Control

In the internal combustion engine which is configured in this way, the outputs of the upstream direction air-fuel ratio sensor 40 and the downstream side air-fuel ratio sensor 41 are used as the basis to set the fuel injection quantity from the fuel injector 11 so that the air-fuel ratio of exhaust gas which flows into the upstream direction exhaust purification catalyst 20 becomes the optimum target air-fuel ratio based on the operating state of the engine. As the method of setting such a fuel injection quantity, the method of using the output of the upstream direction air-fuel ratio sensor 40 as the basis to control the air-fuel ratio of exhaust gas which flows into the upstream direction exhaust purification catalyst 20 (or the air-fuel ratio of exhaust gas which flows out from the engine body) to become the target air-fuel ratio and using the output of the downstream side air-fuel ratio sensor 41 as the basis to correct the output of the upstream direction air-fuel ratio sensor 40 or change the target air-fuel ratio may be mentioned.

Figure 6:
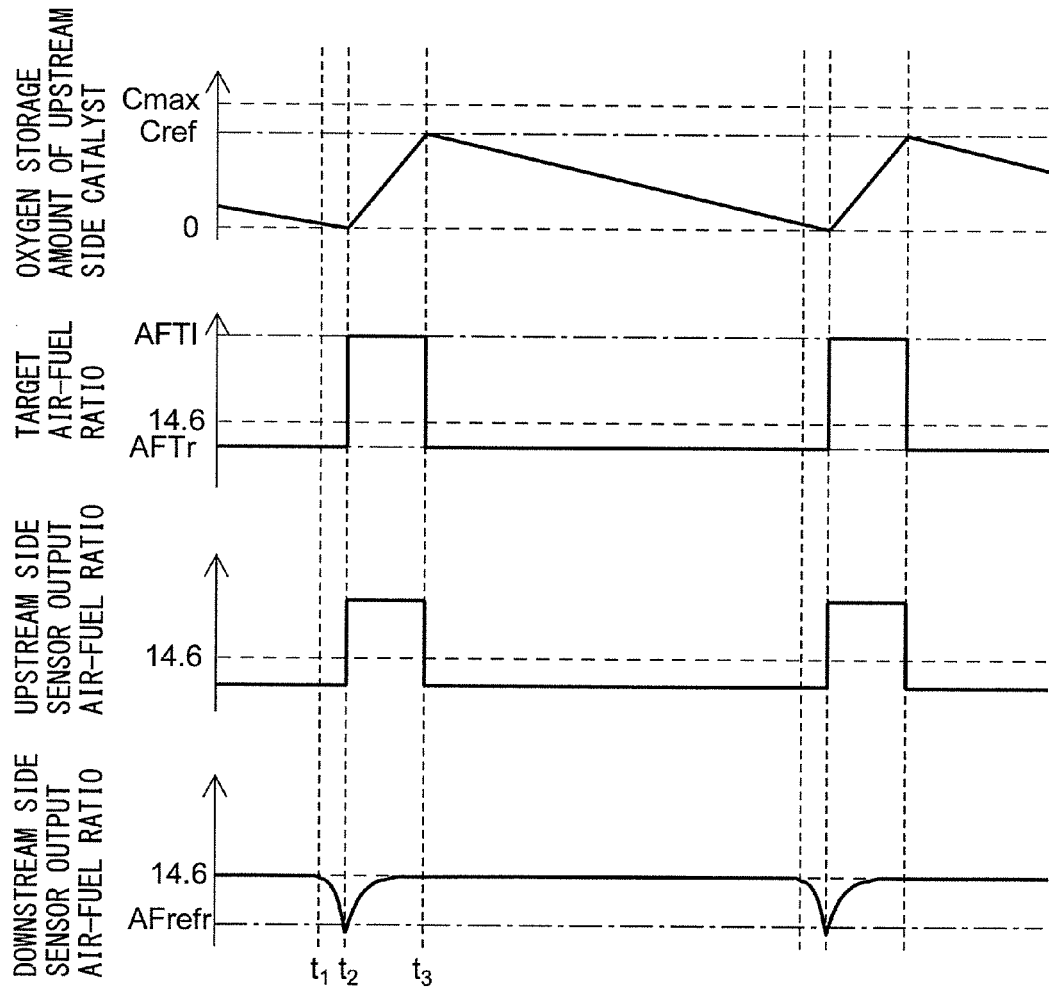
FIG. 6 is a time chart of the oxygen storage amount etc. of an upstream direction exhaust purification catalyst at the time of normal operation of an internal combustion engine.

Referring to FIG. 6, an example of such control of the target air-fuel ratio will be simply explained. FIG. 6 is a time chart of the oxygen storage amount of the upstream direction exhaust purification catalyst, the target air-fuel ratio, the output air-fuel ratio of the upstream direction air-fuel ratio sensor, and the output air-fuel ratio of the downstream side air-fuel ratio sensor at the time of normal operation (normal control) of an internal combustion engine. Note that, the "output air-fuel ratio" means the air-fuel ratio corresponding to the output of the air-fuel ratio sensor. Further, "the time of normal operation (normal control)" means the operating state (control state) where control for adjusting the fuel injection quantity in accordance with a specific operating state of the internal combustion engine (for example, correction to increase the fuel injection quantity performed at the time of acceleration of the vehicle which mounts the internal combustion engine or fuel cut control, the later explained active air-fuel ratio control, etc.)

In the example which is shown in FIG. 6, when the output air-fuel ratio of the downstream side air-fuel ratio sensor 41 is a rich judgment air-fuel ratio AFrefr which is richer than the stoichiometric air-fuel ratio (air-fuel ratio which is richer than the stoichiometric air-fuel ratio, for example, 14.55) or less, the target air-fuel ratio is set to and maintained at the lean setting air-fuel ratio AFTl (for example, 15). After that, the oxygen storage amount of the upstream direction exhaust purification catalyst 20 is estimated. When this estimated value becomes a predetermined judgment reference storage amount Cref (amount smaller than maximum storable oxygen amount Cmax) or more, the target air-fuel ratio is set to and maintained at the rich setting air-fuel ratio AFTr (for example, 14.4). In the example which is shown in FIG. 6, this operation is repeatedly performed.

Specifically, in the example which is shown in FIG. 6, before the time $t_1$, the target air-fuel ratio is made the rich setting air-fuel ratio AFTr. Along with this, the output air-fuel ratio of the upstream direction air-fuel ratio sensor 40 also becomes the rich air-fuel ratio. Further, the upstream direction exhaust purification catalyst 20 stores oxygen, so the output air-fuel ratio of the downstream side air-fuel ratio sensor 41 becomes substantially the stoichiometric air-fuel ratio (14.6). At this time, the air-fuel ratio of exhaust gas which flows into the upstream direction exhaust purification catalyst 20 becomes the rich air-fuel ratio, so the oxygen storage amount of the upstream direction exhaust purification catalyst 20 gradually falls.

After that, at the time $t_1$, the oxygen storage amount of the upstream direction exhaust purification catalyst 20 approaches zero, whereby part of the unburned gas which flows into the upstream direction exhaust purification catalyst 20 starts to flow out without being purified by the upstream direction exhaust purification catalyst 20. As a result, at the time $t_2$, the output air-fuel ratio of the downstream side air-fuel ratio sensor 41 becomes the rich judgment air-fuel ratio AFrefr. At this time, the target air-fuel ratio is switched from the rich setting air-fuel ratio AFTr to the lean setting air-fuel ratio AFTl.

By switching of the target air-fuel ratio, the air-fuel ratio of exhaust gas which flows into the upstream direction exhaust purification catalyst 20 becomes a lean air-fuel ratio and the outflow of unburned gas decreases and stops. Further, the oxygen storage amount of the upstream direction exhaust purification catalyst 20 gradually increases and at the time $t_3$ reaches the judgment reference storage amount Cref. In this way, when the oxygen storage amount reaches the judgment reference storage amount Cref, the target air-fuel ratio is again switched from the lean setting air-fuel ratio AFTl to the rich setting air-fuel ratio AFTr. By switching this target air-fuel ratio, the air-fuel ratio of exhaust gas which flows into the upstream direction exhaust purification catalyst 20 again becomes the lean air-fuel ratio. As a result, the oxygen storage amount of the upstream direction exhaust purification catalyst 20 gradually decreases. After that, this operation is repeatedly performed. By performing such control, it is possible to prevent the outflow of $NO_X$ from the upstream direction exhaust purification catalyst 20.

Note that, the control of the target air-fuel ratio based on the outputs of the upstream direction air-fuel ratio sensor 40 and the downstream side air-fuel ratio sensor 41 is not limited to the control such as explained above. It may be any control so long as control based on the outputs of these air-fuel ratio sensors 40 and 41.

<Diagnosis of Abnormality of Exhaust Purification Catalyst>

Next, referring to FIG. 7 and FIG. 8, the diagnosis of abnormality of the upstream direction exhaust purification catalyst 20 will be explained. In the present embodiment, when diagnosing abnormality of the upstream direction exhaust purification catalyst 20, active air-fuel ratio control is performed which periodically switches the target air-fuel ratio of the exhaust gas which flows into the upstream direction exhaust purification catalyst 20 between the rich air-fuel ratio and the lean air-fuel ratio. Note that, in the following explanation, by active air-fuel ratio control, the target air-fuel ratio is switched from the rich air-fuel ratio to the lean air-fuel ratio, then switched to the rich air-fuel ratio and again switched to the lean air-fuel ratio as one cycle. Alternatively, the target air-fuel ratio is switched from the lean air-fuel ratio to the rich air-fuel ratio, then is switched to the lean air-fuel ratio and again is switched to the rich air-fuel ratio as one cycle. That is, "one cycle" means the period in which the target air-fuel ratio is successively made the rich air-fuel ratio and lean air-fuel ratio.

Further, during this active air-fuel ratio control, the amount of the oxygen which is stored in the upstream direction exhaust purification catalyst 20 or the amount of oxygen which is released from the upstream direction exhaust purification catalyst 20 is estimated and the cumulative value of the estimated amount of oxygen is used as the basis to switch the target air-fuel ratio. More specifically, if the cumulative value obtained by cumulatively adding the estimated amounts of the oxygen which is stored in the upstream direction exhaust purification catalyst 20 from the time the target air-fuel ratio is switched from the rich air-fuel ratio to the lean air-fuel ratio reaches a predetermined reference amount, the target air-fuel ratio is switched from the lean air-fuel ratio to the rich air-fuel ratio. Similarly, if the cumulative value obtained by cumulatively adding the estimated amounts of the oxygen which is released from the upstream direction exhaust purification catalyst 20 from the time the target air-fuel ratio is switched from the lean air-fuel ratio to the rich air-fuel ratio reaches a predetermined reference amount, the target air-fuel ratio is switched from the lean air-fuel ratio to the rich air-fuel ratio. This reference amount is made an amount which is less than the maximum storable oxygen amount when the upstream direction exhaust purification catalyst 20 deteriorates and more than the degree of deterioration of the upstream direction exhaust purification catalyst 20.

In the present embodiment, the amounts (flow rates) of oxygen which is stored in the upstream direction exhaust purification catalyst 20 and oxygen which is released from the upstream direction exhaust purification catalyst 20 are calculated based on the output air-fuel ratio of the upstream direction air-fuel ratio sensor 40 and the intake air amount of the internal combustion engine etc. Specifically, the ECU 31 calculates the amounts of oxygen which becomes excessive or oxygen which becomes insufficient when trying to make the air-fuel ratio of exhaust gas which flows into the upstream direction exhaust purification catalyst 20 the stoichiometric air-fuel ratio as the "oxygen excess/shortage".

That is, the ECU 31 calculates the amount of oxygen which is contained in the exhaust gas or the amount of oxygen which is necessary for burning the unburned gas etc. which is contained in this exhaust gas when assuming that the oxygen and unburned gas etc. in the exhaust gas which flows into the upstream direction exhaust purification catalyst 20 completely react. More specifically, it uses the intake air amount of the internal combustion engine which is calculated based on the air flowmeter 39 etc. and difference of the output air-fuel ratio of the upstream direction air-fuel ratio sensor 40 from the stoichiometric air-fuel ratio (or ratio to it) as the basis to calculate the oxygen excess/shortage. Further, the ECU 31 again switches the target air-fuel ratio when, after switching the target air-fuel ratio, the cumulative value (absolute value) which is obtained by cumulative adding the oxygen excess/shortage reaches a predetermined reference amount.

Further, when, as a result of performing such active air-fuel ratio control, the output air-fuel ratio of the downstream side air-fuel ratio sensor 41 becomes the rich judgment air-fuel ratio or less or the lean judgment air-fuel ratio or more during one cycle, it is judged that the upstream direction exhaust purification catalyst 20 has become abnormal due to deterioration. On the other hand, when the output air-fuel ratio of the downstream side air-fuel ratio sensor is maintained in a range larger than the rich judgment air-fuel ratio and smaller than the lean judgment air-fuel ratio during one cycle, it is judged that the upstream direction exhaust purification catalyst 20 has not become abnormal due to deterioration (is normal).

It is also possible to diagnose abnormality not only for one cycle, but for a plurality of cycles. In this case, when there are a large number of cycles where, during one cycle, the output air-fuel ratio of the downstream side air-fuel ratio sensor 41 is the rich judgment air-fuel ratio or less and the lean judgment air-fuel ratio or more, it is judged that the upstream direction exhaust purification catalyst 20 has become abnormal due to deterioration. On the other hand, when there are a large number of cycles where, during one cycle, the output air-fuel ratio of the downstream side air-fuel ratio sensor is larger than the rich judgment air-fuel ratio and smaller than the lean judgment air-fuel ratio or more, it is judged that the upstream direction exhaust purification catalyst 20 has not become abnormal due to deterioration (is normal)

Figure 7:
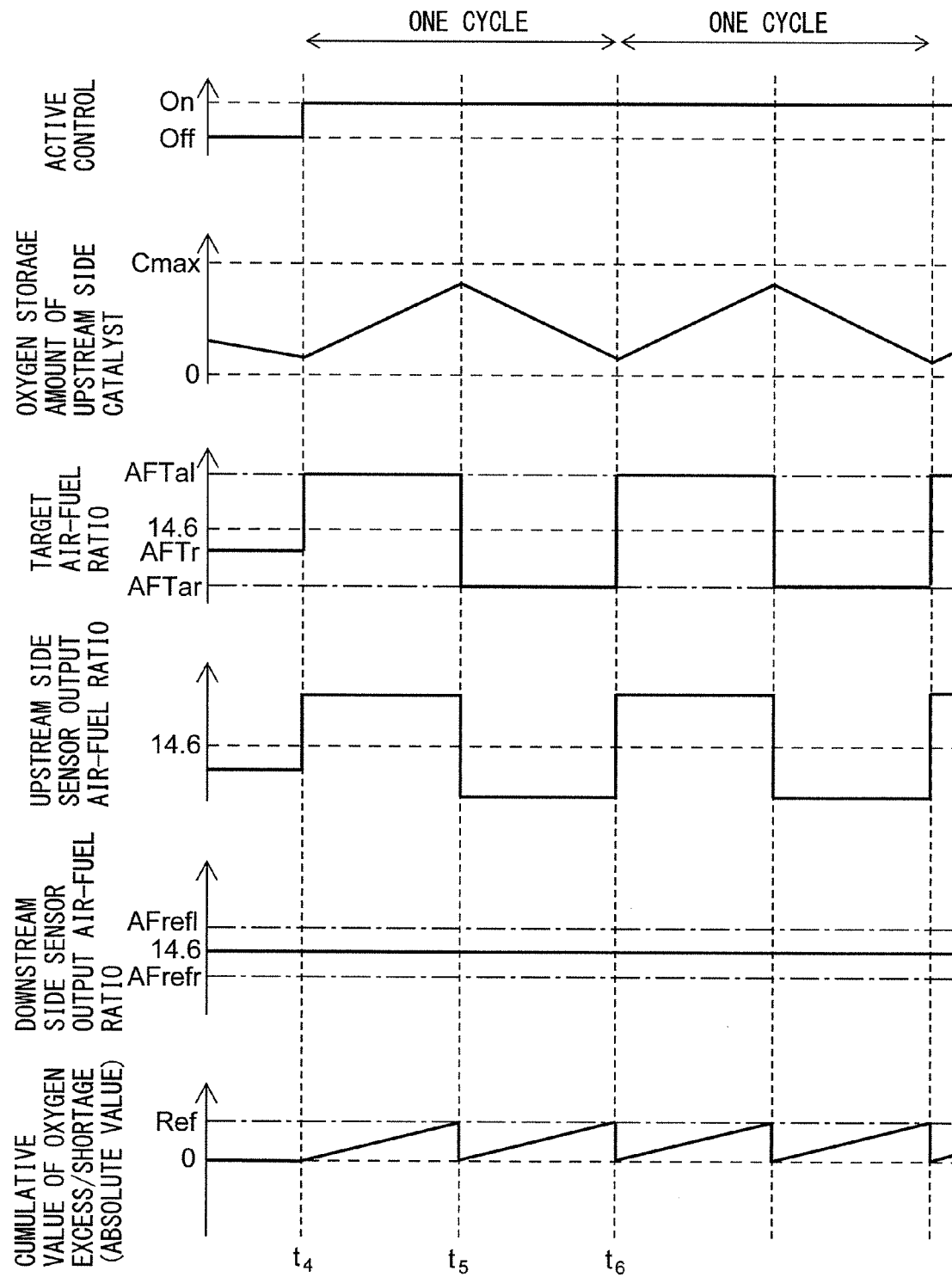
FIG. 7 is a time chart of the oxygen storage amount etc. when performing active air-fuel ratio control

FIG. 7 is a time chart of the oxygen storage amount, the target air-fuel ratio, the output air-fuel ratio of the upstream direction air-fuel ratio sensor 40, the output air-fuel ratio of the downstream side air-fuel ratio sensor 41, and the cumulative value (absolute value) of the oxygen excess/shortage when performing active air-fuel ratio control when diagnosing abnormality of the upstream direction exhaust purification catalyst 20. In particular, FIG. 7 shows the case when the degree of deterioration of the upstream direction exhaust purification catalyst 20 is small, that is, when the upstream direction exhaust purification catalyst 20 has not become abnormal due to deterioration.

In the example which is shown in FIG. 7, before the time $t_4$, the target air-fuel ratio of the exhaust gas which flows into the upstream direction exhaust purification catalyst 20 is made the rich setting air-fuel ratio AFTr. For this reason, the output air-fuel ratio of the upstream direction air-fuel ratio sensor 40 becomes the rich air-fuel ratio. Along with this, the oxygen storage amount of the upstream direction exhaust purification catalyst 20 also gradually decreases. At this time, the unburned gas in the exhaust gas which flows into the upstream direction exhaust purification catalyst 20 is removed by oxidation by the oxygen which is stored in the upstream direction exhaust purification catalyst 20. For this reason, the output air-fuel ratio of the downstream side air-fuel ratio sensor 41 becomes the stoichiometric air-fuel ratio.

At the time $t_4$, if the active air-fuel ratio control is started, in the example which is shown in FIG. 7, the target air-fuel ratio is changed to the active control lean air-fuel ratio AFTal. In the present embodiment, the active control lean air-fuel ratio AFTal is made substantially the same air-fuel ratio as the lean setting air-fuel ratio AFTl, but may also be an air-fuel ratio different from this.

At the time $t_4$, if the target air-fuel ratio is changed to the active control lean air-fuel ratio AFTal, the output air-fuel ratio of the upstream direction air-fuel ratio sensor 40 also changes to the lean air-fuel ratio. Further, the oxygen storage amount of the upstream direction exhaust purification catalyst 20 gradually increases. At this time, the $NO_X$ in the exhaust gas which flows into the upstream direction exhaust purification catalyst 20 is removed by reduction along with the storage of oxygen. For this reason, the output air-fuel ratio of the downstream side air-fuel ratio sensor 41 remains the stoichiometric air-fuel ratio.

On the other hand, at the time $t_4$, if active air-fuel ratio control is started, the cumulative value of the oxygen excess/shortage is calculated. As explained above, at the time $t_4$ on, the output air-fuel ratio of the upstream direction air-fuel ratio sensor 40 becomes the lean air-fuel ratio. For this reason, at the time $t_4$ on, it can be said that the oxygen is excessive when trying to make the air-fuel ratio of exhaust gas which flows into the upstream direction exhaust purification catalyst 20 the stoichiometric air-fuel ratio. For this reason, as shown in FIG. 7, the cumulative value of the oxygen excess/shortage in the exhaust gas which flows into the upstream direction exhaust purification catalyst 20 gradually increases.

After that, at the time $t_5$, if the cumulative value of the oxygen excess/shortage reaches the reference amount Ref, the target air-fuel ratio is switched from the active control lean air-fuel ratio AFTal to the active control rich air-fuel ratio AFTar. In the present embodiment, the active control rich air-fuel ratio AFTar is made an air-fuel ratio which is richer than the rich setting air-fuel ratio AFTr, but it may also be made an air-fuel ratio which is substantially the same as or leaner than the rich setting air-fuel ratio. Note that, the difference of the active control rich air-fuel ratio AFTar from the stoichiometric air-fuel ratio and the difference of the active control lean air-fuel ratio AFTal from the stoichiometric air-fuel ratio are made equal. Further, at the time $t_5$, the cumulative value of the oxygen excess/shortage is reset to 0.

In the example which is shown in FIG. 7, the degree of deterioration of the upstream direction exhaust purification catalyst 20 is small, therefore the maximum storable oxygen amount Cmax is large, so at the time $t_5$, the oxygen storage amount does not reach the maximum storable oxygen amount Cmax. For this reason, in the period of the time $t_4$ to the time $t_5$, $NO_X$ or oxygen does not flow out from the upstream direction exhaust purification catalyst 20. Accordingly, the output air-fuel ratio of the downstream side air-fuel ratio sensor remains the stoichiometric air-fuel ratio.

At the time $t_5$, if the target air-fuel ratio is switched, the output air-fuel ratio of the upstream direction air-fuel ratio sensor 40 also changes to the rich air-fuel ratio. Further, the oxygen storage amount of the upstream direction exhaust purification catalyst 20 gradually decreases. At this time, the unburned gas in the exhaust gas which flows into the upstream direction exhaust purification catalyst 20 is purified by oxidation in the upstream direction exhaust purification catalyst 20, so the output air-fuel ratio of the downstream side air-fuel ratio sensor becomes the stoichiometric air-fuel ratio. In addition, the output air-fuel ratio of the upstream direction air-fuel ratio sensor 40 becomes the rich air-fuel ratio, so it can be said that the oxygen would be insufficient when trying to make the air-fuel ratio of exhaust gas which flows into the upstream direction exhaust purification catalyst 20 the stoichiometric air-fuel ratio. For this reason, the cumulative value of oxygen excess/shortage in the exhaust gas which flows into the upstream direction exhaust purification catalyst 20 gradually decreases. In particular, at FIG. 7, the cumulative value of the oxygen excess/shortage is shown by the absolute value, so the cumulative value of the oxygen excess/shortage of FIG. 7 gradually increases.

After that, at the time $t_6$, if the cumulative value (absolute value) of the oxygen excess/shortage reaches the reference amount Ref, the target air-fuel ratio is switched from the active control rich air-fuel ratio AFTar to the active control lean air-fuel ratio AFTal. In the example which is shown in FIG. 7, as explained above, the maximum storable oxygen amount Cmax is large, so at the time $t_6$, the oxygen storage amount does not reach zero. For this reason, in the period from the time $t_5$ to the time $t_6$, unburned gas does not flow out from the upstream direction exhaust purification catalyst 20. Accordingly, the output air-fuel ratio of the downstream side air-fuel ratio sensor remains the stoichiometric air-fuel ratio. After this, a similar operation is repeatedly performed. Note that, in the example which is shown in FIG. 7, the period from when target air-fuel ratio is switched to the lean air-fuel ratio (time $t_4$) to when it is then again switched to the lean air-fuel ratio (time $t_6$) is defined as one cycle.

In this way, when the degree of deterioration of the upstream direction exhaust purification catalyst 20 is low, the maximum storable oxygen amount of the upstream direction exhaust purification catalyst 20 becomes the reference amount Ref or more. For this reason, while active air-fuel ratio control is being performed, the unburned gas which flows into the upstream direction exhaust purification catalyst 20 is completely removed and oxygen is completely stored. As a result, the output air-fuel ratio of the downstream side air-fuel ratio sensor 41 is maintained at substantially the stoichiometric air-fuel ratio. Therefore, in the present embodiment, during active air-fuel ratio control, when the output air-fuel ratio of the downstream side air-fuel ratio sensor 41 is maintained in a range between the rich judgment air-fuel ratio AFrefr and the lean judgment air-fuel ratio AFrefl, it is judged that the upstream direction exhaust purification catalyst 20 has not deteriorated and is normal.

Figure 8:
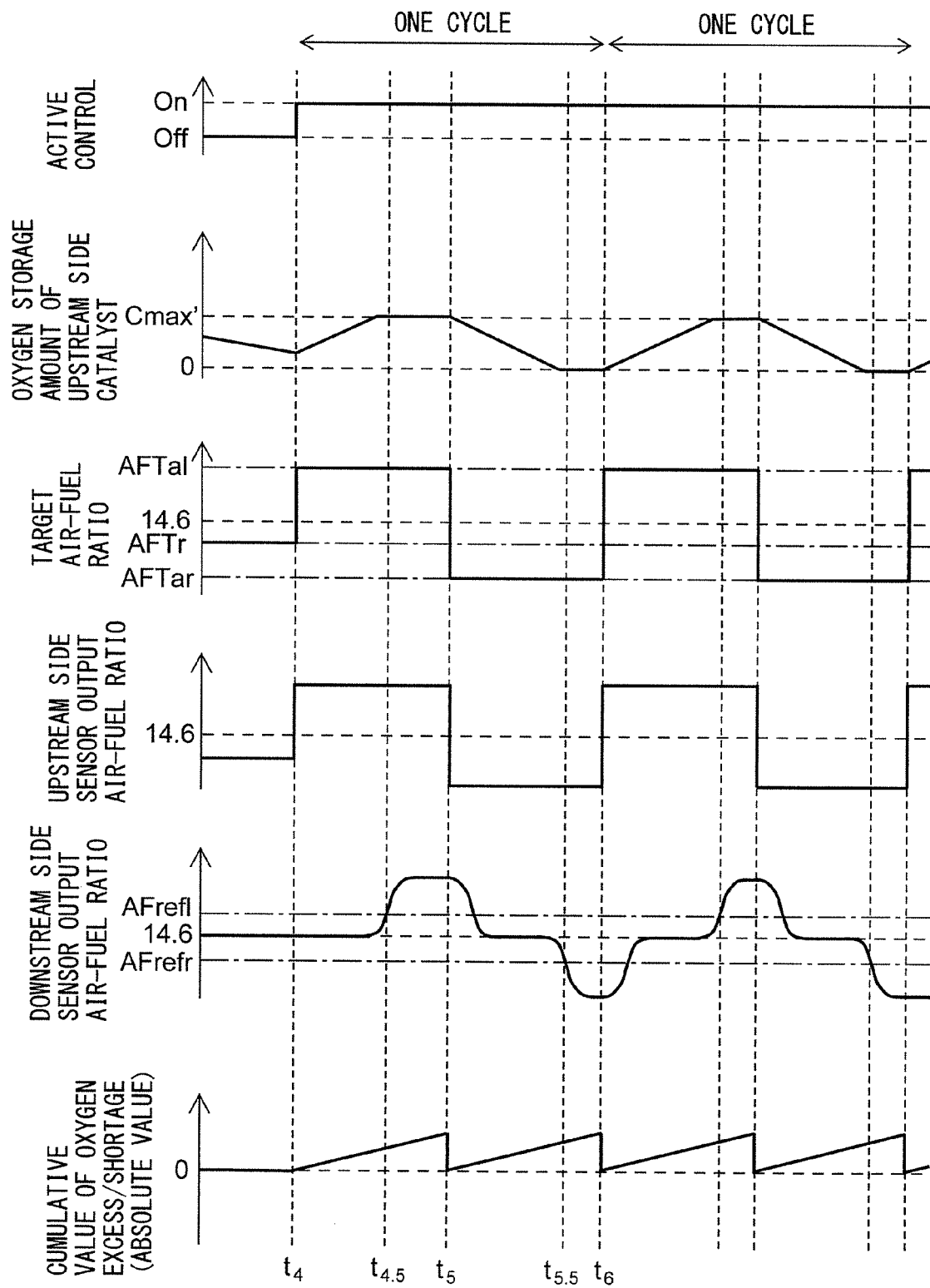
FIG. 8 is a time chart of the oxygen storage amount etc. when performing active air-fuel ratio control

FIG. 8 is also a time chart of the oxygen storage amount when performing active air-fuel ratio control and is a view similar to FIG. 7. In particular, FIG. 8 shows the case where the degree of deterioration of the upstream direction exhaust purification catalyst 20 is large, that is, the case where the upstream direction exhaust purification catalyst 20 becomes abnormal due to deterioration.

In the example which is shown in FIG. 8 as well, before the time $t_4$, control is performed in the same way as the example which is shown in FIG. 7. If, at the time $t_4$, active air-fuel ratio control is started, the target air-fuel ratio is changed to the active control lean air-fuel ratio AFTal. Due to this, the output air-fuel ratio of the upstream direction air-fuel ratio sensor 40 also changes to the lean air-fuel ratio and the oxygen storage amount of the upstream direction exhaust purification catalyst 20 gradually increases. However, at this time, the output air-fuel ratio of the downstream side air-fuel ratio sensor 41 remains the stoichiometric air-fuel ratio.

In the example which is shown in FIG. 8, the degree of deterioration of the upstream direction exhaust purification catalyst 20 is high, so before reaching the time $t_5$, the oxygen storage amount of the upstream direction exhaust purification catalyst 20 reaches the maximum storable oxygen amount Cmax'. For this reason, the upstream direction exhaust purification catalyst 20 no longer can store any further oxygen. As a result, oxygen starts to flow out from the upstream direction exhaust purification catalyst 20. Further, at the time $t_{4.5}$, the output air-fuel ratio of the downstream side air-fuel ratio sensor reaches the lean judgment air-fuel ratio AFrefl, then is maintained at the lean judgment air-fuel ratio AFrefl or more.

At the time $t_5$, if the cumulative value of the oxygen excess/shortage reaches the reference amount Ref, the target air-fuel ratio is switched from the active control lean air-fuel ratio AFTal to the active control rich air-fuel ratio AFTar. Due to this, the output air-fuel ratio of the upstream direction air-fuel ratio sensor 40 also changes to the rich air-fuel ratio and the oxygen storage amount of the upstream direction exhaust purification catalyst 20 gradually decreases. Along with this, the output air-fuel ratio of the downstream side air-fuel ratio sensor converges to the stoichiometric air-fuel ratio.

As explained above, in the example which is shown in FIG. 8, the degree of deterioration of the upstream direction exhaust purification catalyst 20 is high. For this reason, before reaching the time $t_6$, the oxygen storage amount of the upstream direction exhaust purification catalyst 20 reaches zero. For this reason, the upstream direction exhaust purification catalyst 20 can no longer remove any further unburned gas by oxidation. As a result, unburned gas starts to flow out from the upstream direction exhaust purification catalyst 20. Further, at the time $t_{5.5}$, the output air-fuel ratio of the downstream side air-fuel ratio sensor reaches the rich judgment air-fuel ratio AFrefr, then is maintained at the rich judgment air-fuel ratio AFrefr or more.

In this way, when the degree of deterioration of the upstream direction exhaust purification catalyst 20 is high, the maximum storable oxygen amount of the upstream direction exhaust purification catalyst 20 becomes smaller than a reference amount Ref. For this reason, while the active air-fuel ratio control is being performed, unburned gas and oxygen flow out from the upstream direction exhaust purification catalyst 20. As a result, the output air-fuel ratio of the downstream side air-fuel ratio sensor 41 swings to the rich air-fuel ratio and lean air-fuel ratio. Therefore, in the present embodiment, during active air-fuel ratio control, when the output air-fuel ratio of the downstream side air-fuel ratio sensor reaches the rich judgment air-fuel ratio or less and the lean judgment air-fuel ratio or more, it is judged that the upstream direction exhaust purification catalyst 20 becomes abnormal due to deterioration.

In the above way, according to the present embodiment, it is possible to use the output air-fuel ratio of the downstream side air-fuel ratio sensor 41 when performing active air-fuel ratio control as the basis to diagnose abnormality of the upstream direction exhaust purification catalyst 20.

Note that, in the example which is shown in FIG. 7 and FIG. 8, active air-fuel ratio control is performed over a plurality of cycles. However, the diagnosis of abnormality of the upstream direction exhaust purification catalyst 20 may be performed if performing active air-fuel ratio control for at least one cycle, so active air-fuel ratio control may be performed for just one cycle.

On the other hand, as shown in FIG. 7 and FIG. 8, when performing active air-fuel ratio control over a plurality of cycles, the number of cycles among the plurality of cycles where, during one cycle, the output air-fuel ratio of the downstream side air-fuel ratio sensor 41 becomes the rich judgment air-fuel ratio or less and the lean judgment air-fuel ratio or more (cycle judged abnormal) is calculated. Further, when the number of cycles judged abnormal is a predetermined number or more or when the ratio of the number of cycles judged abnormal to the number of all cycles in the active air-fuel ratio control becomes a predetermined number or more, it may be judged that the upstream direction exhaust purification catalyst 20 becomes abnormal due to deterioration. In addition, when performing active air-fuel ratio control over a plurality of cycles, the number of cycles among the plurality of cycles where, during one cycle, the output air-fuel ratio of the downstream side air-fuel ratio sensor 41 becomes larger than the rich judgment air-fuel ratio and smaller than the lean judgment air-fuel ratio (cycle judged normal) is calculated. Further, when the number of cycles judged normal is a predetermined number or more or when the ratio of the number of cycles judged normal to the number of all cycles in the active air-fuel ratio control becomes a predetermined number or more, it may be judged that the upstream direction exhaust purification catalyst 20 is normal.

Further, in the example which is shown in FIG. 7 and FIG. 8, the output air-fuel ratio of the downstream side air-fuel ratio sensor 41 at the first cycle ($t_4$ to $t_6$) from the start of active air-fuel ratio control is used as the basis to diagnose abnormality of the upstream direction exhaust purification catalyst 20. However, right after the start of active air-fuel ratio control, sometimes the oxygen storage amount etc. at the time of start of control causes the output air-fuel ratio of the downstream side air-fuel ratio sensor 41 to become unsuitable. Therefore, the output air-fuel ratio of the downstream side air-fuel ratio sensor 41 from the elapse of at least one cycle after the start of active air-fuel ratio control (that is, in the example of FIG. 7 and FIG. 8, time $t_6$ on) may also be used as the basis for diagnosis.

<Diagnosis of Abnormality Considering Deviation of Sensor>

In this regard, as explained above, the air-fuel ratio of exhaust gas which flows into the upstream direction exhaust purification catalyst 20 is feedback controlled to the target air-fuel ratio based on the output air-fuel ratio of the upstream direction air-fuel ratio sensor 40. In this regard, the output air-fuel ratio of the upstream direction air-fuel ratio sensor 40 sometimes deviates from the actual air-fuel ratio. For example, when using a limit current type air-fuel ratio sensor of the above such configuration as the upstream direction air-fuel ratio sensor 40, if the ratio of hydrogen which is contained in the exhaust gas increases, the output air-fuel ratio will end up deviating to the rich side along with this. In this way, if the output air-fuel ratio of the upstream direction air-fuel ratio sensor 40 deviates in value, even if performing the above-mentioned feedback control, the actual air-fuel ratio of the exhaust gas which flows into the upstream direction exhaust purification catalyst 20 ends up deviating from the target air-fuel ratio.

Figure 9:
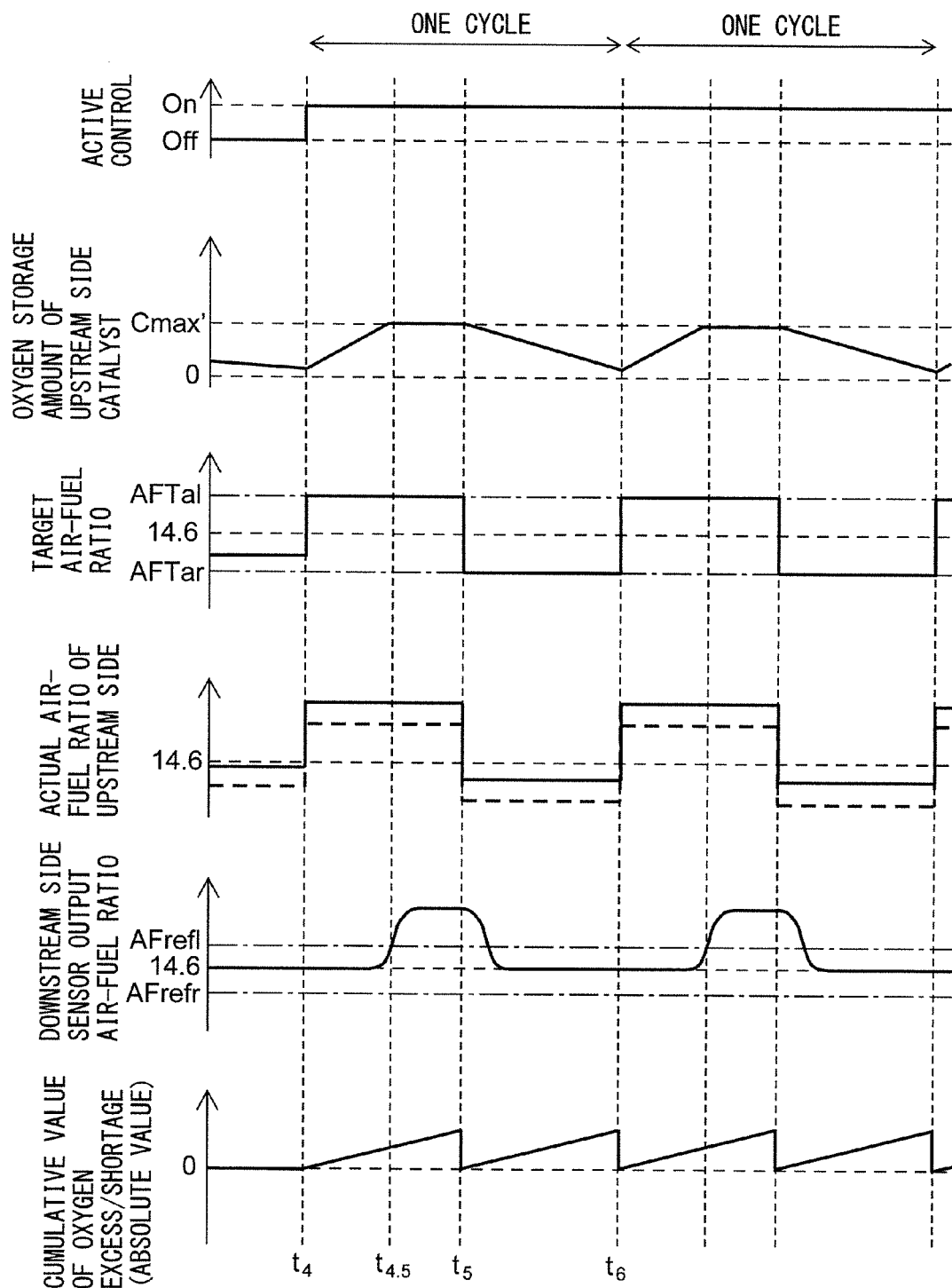
FIG. 9 is a time chart of the oxygen storage amount etc. when performing active air-fuel ratio control

FIG. 9 is a time chart of the oxygen storage amount etc. at the time of active air-fuel ratio control and is a view which is similar to FIG. 8. In particular, FIG. 9 shows the case where the output air-fuel ratio of the upstream direction air-fuel ratio sensor 40 deviates to the rich side. Further, FIG. 9, like FIG. 8, shows the case of a large degree of deterioration of the upstream direction exhaust purification catalyst 20. Note that, in FIG. 9, instead of the output air-fuel ratio of the upstream direction air-fuel ratio sensor 40 of FIG. 8, the actual air-fuel ratio of the exhaust gas which flows into the upstream direction exhaust purification catalyst 20 is shown (below, referred to as the "actual air-fuel ratio of the inflowing exhaust gas"). Further, in FIG. 9, the broken line shows the output air-fuel ratio of the upstream direction air-fuel ratio sensor 40.

In the example which is shown in FIG. 9 as well, before the time $t_4$, control is performed in the same way as the example which is shown in FIGS. 7 and 8. However, the output air-fuel ratio of the upstream direction air-fuel ratio sensor 40 deviates in value, so the actual air-fuel ratio of the inflowing exhaust gas becomes leaner than the target air-fuel ratio. If, at the time $t_4$, active air-fuel ratio control is started, the target air-fuel ratio is changed to the active control lean air-fuel ratio AFTal. The output air-fuel ratio of the upstream direction air-fuel ratio sensor 40 deviates in value, so the actual air-fuel ratio of the inflowing exhaust gas becomes leaner than the active control lean air-fuel ratio AFTal. As a result, the oxygen storage amount of the upstream direction exhaust purification catalyst 20 rapidly increases and immediately reaches the maximum storable oxygen amount Cmax'. As a result, at the time $t_{4.5}$, the output air-fuel ratio of the downstream side air-fuel ratio sensor 41 reaches the lean judgment air-fuel ratio AFrefl, then is maintained at the lean judgment air-fuel ratio AFrefl or more.

At the time $t_5$, if the cumulative value of the oxygen excess/shortage reaches the reference amount Ref, the target air-fuel ratio is switched from the active control lean air-fuel ratio AFTal to the active control rich air-fuel ratio AFTar. However, the output air-fuel ratio of the upstream direction air-fuel ratio sensor 40 deviates in value, so the actual air-fuel ratio of the inflowing exhaust gas becomes leaner than the active control rich air-fuel ratio AFTar. That is, the actual air-fuel ratio of the inflowing exhaust gas becomes a rich air-fuel ratio with a small degree of richness. As a result, the oxygen storage amount of the upstream direction exhaust purification catalyst 20 decreases extremely slowly.

If the oxygen storage amount of the upstream direction exhaust purification catalyst 20 slowly decreases in this way, despite the upstream direction exhaust purification catalyst 20 being high in degree of deterioration and the maximum storable oxygen amount being small, even at the time $t_6$, the oxygen storage amount does not reach zero. Therefore, even at the time $t_6$, the output air-fuel ratio of the downstream side air-fuel ratio sensor 41 is maintained at substantially the stoichiometric air-fuel ratio. For this reason, at the time $t_6$, before the output air-fuel ratio of the downstream side air-fuel ratio sensor 41 reaches the rich judgment air-fuel ratio AFrefr, the target air-fuel ratio is switched from the active control rich air-fuel ratio AFTar to the active control lean air-fuel ratio AFTal. After that, a similar operation is repeated.

As will be understood from FIG. 9, when the output air-fuel ratio of the upstream direction air-fuel ratio sensor 40 deviates in value, the degree of richness of the actual air-fuel ratio when making the target air-fuel ratio in active air-fuel ratio control the rich air-fuel ratio and the degree of leanness of the actual air-fuel ratio when making the target air-fuel ratio the lean air-fuel ratio do not become equal. For this reason, the output air-fuel ratio of the downstream side air-fuel ratio sensor 41 swings to only one of the rich air-fuel ratio and the lean air-fuel ratio. In particular, in the example which is shown in FIG. 9, the case is shown where the output air-fuel ratio of the downstream side air-fuel ratio sensor 41 deviates to the rich side, so the output air-fuel ratio swings to only the lean side. On the other hand, when the output air-fuel ratio of the downstream side air-fuel ratio sensor 41 deviates to the lean side, the output air-fuel ratio swings to only the rich side. Further, in the example which is shown in FIG. 9, the case is shown where the degree of deterioration of the upstream direction exhaust purification catalyst 20 is high, but a similar phenomenon occurs even when the degree of deterioration of the upstream direction exhaust purification catalyst 20 is low.

Therefore, in the present embodiment, during active air-fuel ratio control, when the output air-fuel ratio of the downstream side air-fuel ratio sensor 41 reaches only one of the rich judgment air-fuel ratio or less or lean judgment air-fuel ratio or more, it is judged that the output air-fuel ratio of the downstream side air-fuel ratio sensor 41 becomes abnormal. Further, when judged in this way, in the present embodiment, diagnosis of abnormality of the upstream direction exhaust purification catalyst 20 is suspended and further the active air-fuel ratio control is suspended.

As explained above, when the output air-fuel ratio of the downstream side air-fuel ratio sensor 41 deviates in value, regardless of the degree of deterioration of the upstream direction exhaust purification catalyst 20, during active air-fuel ratio control, the output air-fuel ratio of the downstream side air-fuel ratio sensor 41 swings to only one of the rich air-fuel ratio side or lean air-fuel ratio side. For this reason, when the output air-fuel ratio swings to only one side, it cannot be judged what extent the degree of deterioration of the upstream direction exhaust purification catalyst 20 is. According to the present embodiment, in such a case, diagnosis of abnormality of the upstream direction exhaust purification catalyst 20 is suspended, so the degree of deterioration of the upstream direction exhaust purification catalyst 20 can be prevented from ending up being mistakenly judged.

Note that, in the example which is shown in FIG. 9, the active air-fuel ratio control is performed over a plurality of cycles. However, diagnosis of abnormality of the upstream direction air-fuel ratio sensor 40, in the same way as diagnosis of abnormality of the upstream direction exhaust purification catalyst 20, may be performed if performing active air-fuel ratio control for at least one cycle, so active air-fuel ratio control may be performed for just one cycle. Further, when active air-fuel ratio control is performed over a plurality of cycles, in the same way as diagnosis of abnormality of the upstream direction exhaust purification catalyst 20, the number of the cycles judged abnormal where the output air-fuel ratio of the downstream side air-fuel ratio sensor 41 swings to either the rich air-fuel ratio or lean air-fuel ratio or the ratio thereof may be used as the basis for judgment.

Note that, in the above embodiment, as control whereby the air-fuel ratio of exhaust gas which flows into the upstream direction exhaust purification catalyst 20 becomes the target air-fuel ratio, feedback control which uses the upstream direction air-fuel ratio sensor 41 is used. However, for example, it is also possible to control the fuel injection quantity so that the air-fuel ratio of exhaust gas which is calculated based on the intake air amount which is detected by the air flowmeter 39 and the fuel injection quantity from the fuel injector 11 becomes the target air-fuel ratio. Even in such a case, sometimes deviation occurs between the calculated air-fuel ratio of exhaust gas and the actual air-fuel ratio. Therefore, even in such a case, when, during active air-fuel ratio control, the output air-fuel ratio of the downstream side air-fuel ratio sensor 41 swings to either the rich air-fuel ratio or lean air-fuel ratio, it is judged that the air-fuel ratio control means has become abnormal.

<Flow Chart>

Figure 10:
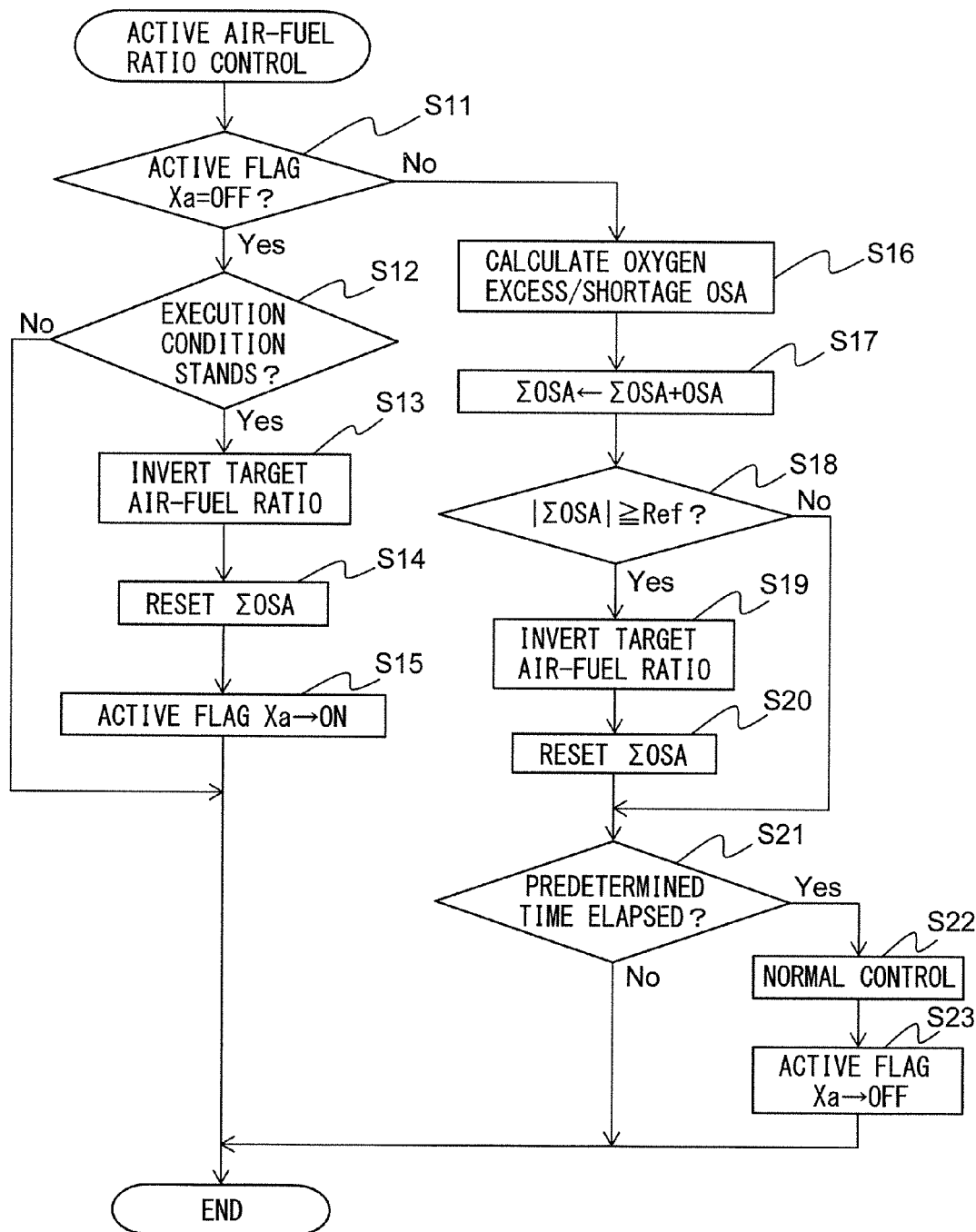
FIG. 10 is a flow chart which shows a control routine of the active air-fuel ratio control.

FIG. 10 is a flow chart which shows the control routine of the active air-fuel ratio control. The illustrated control routine is performed by interruption every certain time interval.

As shown in FIG. 10, first, at step S11, it is judged if the active flag Xa is OFF. The active flag Xa is a flag which is set ON when active air-fuel ratio control is being performed and is set OFF when otherwise. When it is judged at step S11 that the active flag Xa is OFF, the routine proceeds to step S12. At step S12, it is judged if the condition for executing active air-fuel ratio control stands. The condition for executing active air-fuel ratio control stands, for example, when the upstream direction exhaust purification catalyst 20 and the air-fuel ratio sensors 40 and 41 are active and abnormality diagnosis is not yet performed after the start of the internal combustion engine (or after the ignition key of a vehicle mounting the internal combustion engine is turned ON). When it is judged at step S12 that the condition for executing active air-fuel ratio control does not stand, the control routine is ended. On the other hand, when it is judged that the condition for executing active air-fuel ratio control stands, the routine proceeds to step S13.

At step S13, the target air-fuel ratio is made to invert. Therefore, when the current target air-fuel ratio is the rich air-fuel ratio, the target air-fuel ratio is switched to the active control lean air-fuel ratio AFTal. On the other hand, when the current target air-fuel ratio is the lean air-fuel ratio, the target air-fuel ratio is switched to the active control rich air-fuel ratio AFTar. Next, at step S14, the cumulative value ΣOSA of the oxygen excess/shortage OSA is reset to zero. At step S15, the active flag Xa is set ON.

At step S15, in the control routine after the active flag Xa is set to ON, it is judged that the active flag Xa is ON at step S11 and the routine proceeds to step S16. At step S16, the output air-fuel ratio of the upstream direction air-fuel ratio sensor 40 and the intake air amount which is detected by the air flowmeter 39 are used as the basis to calculate the oxygen excess/shortage OSA. Next, at step S17, the oxygen excess/shortage OSA which was calculated at step S16 is added to the cumulative value ΣOSA of the oxygen excess/shortage which was calculated at the previous control routine and the result is made the new oxygen excess/shortage ΣOSA (ΣOSA=ΣOSA+OSA).

Next, at the step S18, it is judged if the absolute value of the cumulative value ΣOSA of the oxygen excess/shortage which was calculated at step S17 is the reference amount Ref or more. When it is judged at step S18 that the absolute value of the cumulative value ΣOSA is smaller than the reference amount Ref, the routine proceeds to step S21. On the other hand, when it is judged at step S18 that the absolute value of the cumulative value ΣOSA is the reference amount Ref or more, the routine proceeds to step S19.

At step S19, the target air-fuel ratio is made to invert. Therefore, when the current target air-fuel ratio is the active control rich air-fuel ratio AFTar, the target air-fuel ratio is switched to the active control lean air-fuel ratio AFTal. On the other hand, when the current target air-fuel ratio is the active control lean air-fuel ratio AFTal, the target air-fuel ratio is switched to the active control rich air-fuel ratio AFTar. Next, at step S20, the cumulative value ΣOSA of the oxygen excess/shortage is reset to zero.

At step S21, it is judged if the elapsed time from when starting active air-fuel ratio control has become a predetermined time or more. If it is judged that the elapsed time is shorter than the predetermined time, the control routine is made to end. On the other hand, when it is judged that the elapsed time is a predetermined time or more, the routine proceeds to step S22. At step S22, the active air-fuel ratio control is made to end and normal control is resumed. Next, at step S23, the active flag Xa is set to OFF.

Note that, in the above example, the timing of ending the active air-fuel ratio control is made the timing at which the elapsed time from the start becomes a predetermined time or more. However, the end timing of the active air-fuel ratio control may also be another timing. As such another timing, for example, the timing at which the number of inversions of the target air-fuel ratio from when starting active air-fuel ratio control becomes a predetermined number of more, the timing at which the diagnosis of abnormality of the timing upstream direction exhaust purification catalyst 20 ends, etc. may be mentioned.

Figure 11:
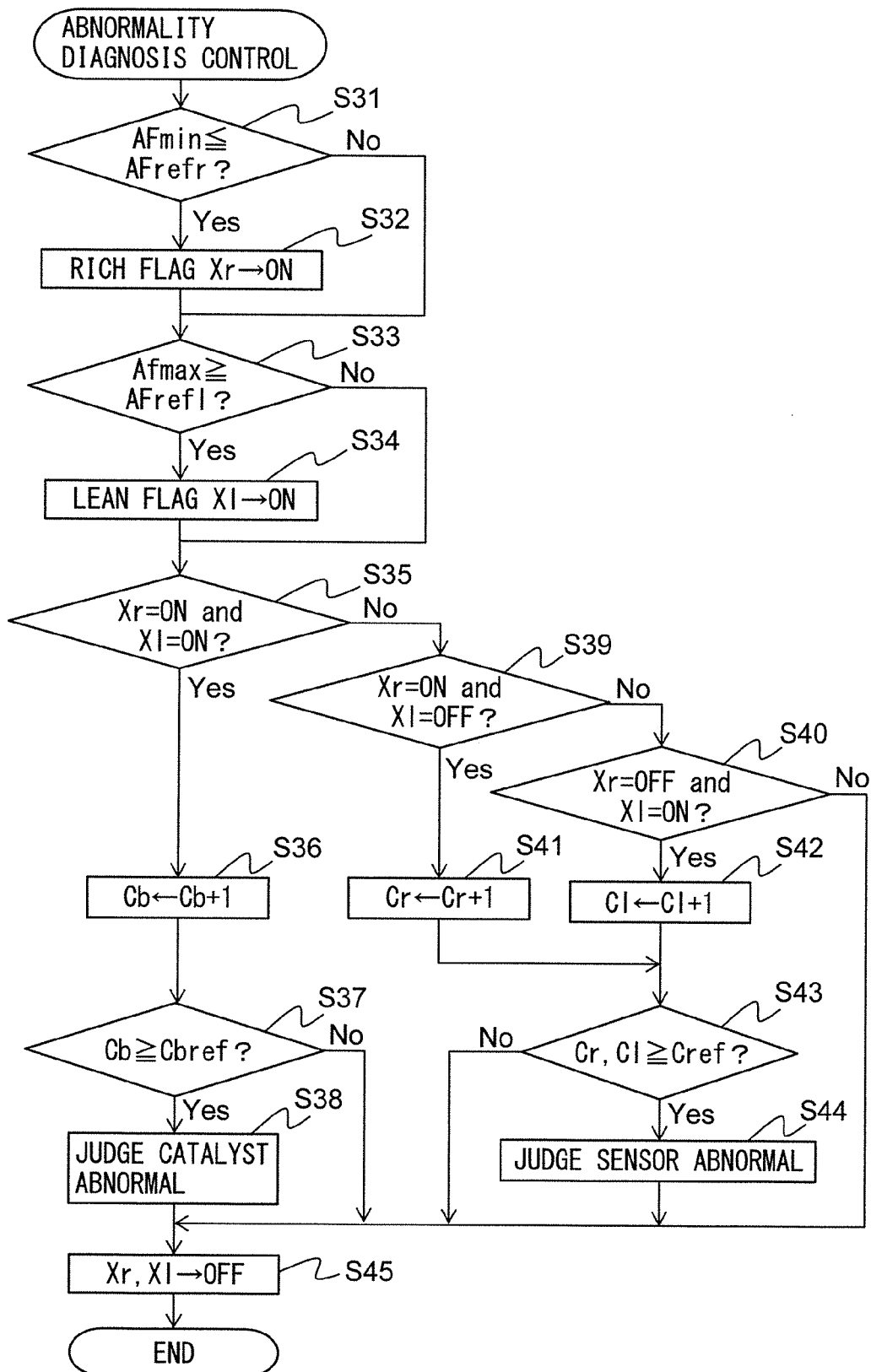
FIG. 11 is a flow chart which shows a control routine of abnormality diagnosis control.

FIG. 11 is a flow chart which shows the control routine of abnormality diagnosis control. The control routine which is illustrated is executed at the timing of the end of one cycle of active air-fuel ratio control.

As shown in FIG. 11, first, at step S31, it is judged if the minimum AFmin of the output air-fuel ratio of the downstream side air-fuel ratio sensor 41 at the current cycle is the rich judgment air-fuel ratio AFrefr or less. If it is judged at step S31 that the minimum value AFmin of the output air-fuel ratio is the rich judgment air-fuel ratio AFrefr or less, the routine proceeds to step S32. At step S32, the rich flag Xr is set ON. The rich flag Xr is set ON when the output air-fuel ratio of the downstream side air-fuel ratio sensor 41 at each cycle is the rich judgment air-fuel ratio AFrefr or less and is OFF when otherwise. On the other hand, if it is judged at step S31 that the minimum value AFmin of the output air-fuel ratio is larger than the rich judgment air-fuel ratio AFrefr, step S32 is skipped.

Next, at step S33, it is judged if the maximum value AFmax of the output air-fuel ratio of the downstream side air-fuel ratio sensor 41 at the current cycle is the lean judgment air-fuel ratio AFrefl or more. When it is judged at step S31 that the maximum value AFmax of the output air-fuel ratio is the rich judgment air-fuel ratio AFref or more, the routine proceeds to step S34. At step S34, the lean flag Xl is set to ON. The rich flag Xl is a flag which is set ON when the output air-fuel ratio of the downstream side air-fuel ratio sensor 41 has become the lean judgment air-fuel ratio AFrefl or more at each cycle and is set OFF at other times. On the other hand, when it is judged at step S33 that the maximum value AFmax of the output air-fuel ratio is smaller than the rich judgment air-fuel ratio AFrefl, step S34 is skipped.

Next, at step S35, it is judged if the rich flag Xr and the lean flag Xl are both ON. When it is judged at step S35 that both flags Xr and Xl are ON, the routine proceeds to step S36. At step S36, the abnormality counter CB is incremented by "1". The abnormality counter Cb is a counter which expresses the number of times the output air-fuel ratio of the downstream side air-fuel ratio sensor 41 greatly swings to both the rich air-fuel ratio and lean air-fuel ratio during one cycle. Next, at step S37, it is judged if the abnormal counter Cb has become a predetermined number Cbref or more. If smaller than the predetermined number Cbref, the control routine is ended. On the other hand, when the predetermined number Cbref or more, the routine proceeds to step S38. At step S38, it is judged that the upstream direction exhaust purification catalyst 20 has become abnormal and the control routine is ended.

On the other hand, when it is judged at step S35 that at least one of the rich flag Xr and the lean flag Xl becomes OFF, the routine proceeds to steps S39 and S40. At steps S39 and S40, it is judged if either of the rich flag Xr and lean flag Xl is ON. When it is judged that only the rich flag Xr is ON, the routine proceeds to S41. At step S41, the rich counter Cr is incremented by "1", then the routine proceeds to step S43. The rich counter Cr is a counter which expresses the number of times the output air-fuel ratio of the downstream side air-fuel ratio sensor 41 greatly swings to only the rich air-fuel ratio in one cycle.

On the other hand, when it is judged at steps S39 and S40 that only the lean flag Xl is ON, the routine proceeds to S42. At step S42, the lean counter Cl is incremented by "1", then the routine proceeds to step S43. The lean counter Cl is a counter which expresses the number of times the output air-fuel ratio of the downstream side air-fuel ratio sensor 41 greatly swings to only the lean air-fuel ratio in one cycle.

At step S43, it is judged if the rich counter Cr and lean counter Cl have become the predetermined number Cref or more. If smaller than the predetermined number Cref, the control routine is made to end. On the other hand, if the predetermined number Cref or more, the routine proceeds to step S44. At step S44, it is judged if the output air-fuel ratio of the upstream direction air-fuel ratio sensor 40 has become abnormal and the control routine is made to end. On the other hand, when it is judged at steps S39 and S40 that both of the rich flag Xr and lean flag Xl are OFF, the control routine is made to end.

Second Embodiment

Next, referring to FIG. 12, an abnormality diagnosis system of a second embodiment of the present invention will be explained. The configuration etc. of the abnormality diagnosis system of the second embodiment are basically similar to the abnormality diagnosis system of the first embodiment. However, in the abnormality diagnosis system of the first embodiment, if it is judged that the output air-fuel ratio of the downstream side air-fuel ratio sensor 41 has become abnormal, the abnormality diagnosis of the upstream direction exhaust purification catalyst 20 and the active air-fuel ratio control were suspended. As opposed to this, in the abnormality diagnosis system of the second embodiment, in such a case, the output air-fuel ratio of the upstream direction air-fuel ratio sensor 41 or the target air-fuel ratio is corrected.

FIG. 12 is a time chart of the oxygen storage amount of the upstream direction exhaust purification catalyst 20, the actual air-fuel ratio of the exhaust gas which flows into the upstream direction exhaust purification catalyst 20, the output air-fuel ratio of the downstream side air-fuel ratio sensor 41, the cumulative value (absolute value) of the oxygen excess/shortage, and the correction amount of the output air-fuel ratio when performing active air-fuel ratio control. FIG. 12 shows the case where, like in FIG. 9, the output air-fuel ratio of the upstream direction air-fuel ratio sensor 40 deviates to the rich side.

In the example which is shown in FIG. 12, before the time $t_6$, active air-fuel ratio control has already been performed for one cycle or more. In the example which is shown in FIG. 12, at the times $t_6$ and $t_8$, the target air-fuel ratio is switched to the active control lean air-fuel ratio AFTal, while at the times $t_7$ and $t_9$, the target air-fuel ratio is switched to the active control rich air-fuel ratio AFTar. In addition, in the example which is shown in FIG. 12, at the times $t_{6.5}$ and $t_{8.5}$, the output air-fuel ratio of the downstream side air-fuel ratio sensor 41 is the lean judgment air-fuel ratio AFrefl or more.

Here, as shown in FIG. 12, the amount of oxygen which is stored in the upstream direction exhaust purification catalyst 20 between the times $t_6$ to $t_{6.5}$ and the amount of oxygen which is released from the upstream direction exhaust purification catalyst 20 between the times $t_7$ to $t_8$ are equal. On the other hand, the cumulative value of the oxygen excess/shortage between the times $t_6$ to $t_{6.5}$ and the cumulative value of the oxygen excess/shortage between the times $t_7$ to $t_8$ are different values. If no deviation occurs in the output air-fuel ratio of the upstream direction air-fuel ratio sensor 40, these cumulative values of oxygen excess/shortage should be equal. In other words, the difference $\Delta\Sigma OSC$ of these cumulative values of the oxygen excess/shortage can be said to express the amount of deviation of the output air-fuel ratio of the upstream direction air-fuel ratio sensor 40.

Therefore, in the present embodiment, if it is judged that the output air-fuel ratio of the downstream side air-fuel ratio sensor 41 has become abnormal, the active air-fuel ratio control is not suspended, but is continued and the difference $\Delta\Sigma OSC$ of the cumulative values of oxygen excess/shortage is used as the basis to correct deviation of the output air-fuel ratio of the upstream direction air-fuel ratio sensor 40. In particular, in the present embodiment, the deviation of the output air-fuel ratio is corrected so that the cumulative value of the oxygen excess/shortage at the times $t_6$ to $t_{6.5}$ and the cumulative value of the oxygen excess/shortage at the times $t_7$ to $t_8$ become equal, that is, so that the difference $\Sigma OSC$ of the cumulative value of the oxygen excess/shortage approaches zero.

Here, $\Delta\Sigma OSC$ can be expressed as in the following equation (1) if making the deviation rate at the output air-fuel ratio of the downstream side air-fuel ratio sensor 41 "k". Note that, in the following equation (1), Ga indicates the amount (g/sec) of exhaust gas which flows into the upstream direction exhaust purification catalyst 20, 0.23 indicates the mass ratio of oxygen in the atmosphere, AFst indicates the air-fuel ratio forming the center of control (in the present embodiment, the stoichiometric air-fuel ratio), and AF indicates the output air-fuel ratio of the upstream direction air-fuel ratio sensor 40. Further, in the following equation (1), Σ means the cumulative addition at one cycle or several cycles.

$$\Delta \Sigma OSA = \sum 0.23 \cdot Ga \cdot \frac{AF - AFst \frac{1}{k+1}}{AF} \quad (1)$$

On the other hand, the cumulative value of the oxygen excess/shortage (excess) at the times $t_6$ to $t_7$ and the cumulative value of the oxygen excess/shortage (shortage) at the times $t_7$ to $t_8$ are equal, so the cumulative value of the oxygen excess/shortage at the times $t_6$ to $t_8$ becomes 0. For this reason, the following equation (2) stands.

$$0 = \sum 0.23 \cdot Ga \cdot \frac{AF - AFst}{AF} \quad (2)$$

Further, if together solving said equation (1) and equation (2), the following equation (3) can be derived.

$$k = \frac{\Delta \Sigma OSA}{\sum 0.23 \cdot Ga \cdot \frac{AFst}{AF} - \Delta \Sigma OSA} \quad (3)$$

Therefore, according to equation (3), the difference $\Delta \Sigma OSA$ between the cumulative value of the oxygen excess/shortage at the times $t_6$ to $t_{6.5}$ and the cumulative value (absolute value) of the oxygen excess/shortage at the times $t_7$ to $t_8$ can be used as the basis to calculate the deviation rate "k" of the output air-fuel ratio of the downstream side air-fuel ratio sensor 41.

Therefore, in the present embodiment, the deviation rate "k" of the output air-fuel ratio which is calculated in this way is used as the basis to correct the target air-fuel ratio. Specifically, the target air-fuel ratio AFT is corrected based on the following equations (4) and (5).

$$AFT = AFTbase(1 + sfbg(k)) \quad (4)$$

$$sfbg(k) = sfbg(k-1) + gain \cdot k(k) \quad (5)$$

Note that, in the above equation (4), the target base air-fuel ratio AFTbase is the air-fuel ratio which is determined based on the above-mentioned control of the target air-fuel ratio. In accordance with the situation of control, the active control lean air-fuel ratio AFTal etc. is entered. Further, sfbg(k) is the target air-fuel ratio correction amount at the current calculation. The gain in said equation (5) is the gain which expresses the extent of the calculated deviation rate "k" reflected in the target air-fuel ratio. The gain is made a predetermined value between 0 and 1.

At the time $t_8$, as explained above, by correcting the target air-fuel ratio, from the time $t_8$ on, the effect of the deviation of the output air-fuel ratio of the upstream direction air-fuel ratio sensor 40 becomes smaller. As shown in FIG. 12, at the time $t_8$ on, the actual air-fuel ratio of the inflowing exhaust gas approaches the output air-fuel ratio of the upstream direction air-fuel ratio sensor 40. As a result, in active air-fuel ratio control, the difference between the richness degree of the actual air-fuel ratio at the time of making the target air-fuel ratio a rich air-fuel ratio and the leanness degree of the actual air-fuel ratio at the time of making the target air-fuel ratio a lean air-fuel ratio becomes smaller.

By repeating this operation at the time $t_8$ on, the difference ΣOSC of the cumulative value of the oxygen excess/shortage also gradually becomes smaller ($\Sigma OSC_1 > \Sigma OSC_2 > \Sigma OSC_3$). Further, finally, the effect of deviation of the output air-fuel ratio of the upstream direction air-fuel ratio sensor 40 can be made smaller. At this stage, by again diagnosing abnormality of the upstream direction exhaust purification catalyst 20 explained above, it becomes possible to more accurately diagnose abnormality of the upstream direction exhaust purification catalyst 20.

Note that, in the above embodiment, the calculated deviation rate "k" is used as the basis to correct the target air-fuel ratio, but it is also possible to correct the output air-fuel ratio of the upstream direction air-fuel ratio sensor 40. Further, the above embodiment shows the case where the output air-fuel ratio of the upstream direction air-fuel ratio sensor 40 deviates to the rich side, but similar control may be performed even if it deviates to the lean side. Therefore, in the present embodiment, it can be said that the output air-fuel ratio of the upstream direction air-fuel ratio sensor 40 or target air-fuel ratio is corrected so that the difference becomes smaller between the absolute value of the cumulative oxygen excess/shortage which is cumulatively added by the oxygen excess/shortage estimating means from when the target air-fuel ratio is switched from the rich air-fuel ratio to the lean air-fuel ratio then again switched to the rich air-fuel ratio or the output air-fuel ratio of the downstream side air-fuel ratio sensor 41 becomes the lean judgment air-fuel ratio or more and the absolute value of the cumulative oxygen excess/shortage which is cumulatively added by the oxygen excess/shortage estimating means from when the target air-fuel ratio is switched from the lean air-fuel ratio to the rich air-fuel ratio then again switched to the lean air-fuel ratio or the output air-fuel ratio of the downstream side air-fuel ratio sensor 41 becomes the rich judgment air-fuel ratio or less.

Further, the example which is shown in FIG. 12 shows the case where the output air-fuel ratio of the downstream side air-fuel ratio sensor 41 does not become the rich judgment air-fuel ratio AFrefr or less and only becomes the lean judgment air-fuel ratio AFrefl or more. In this case, as explained above, the target air-fuel ratio is corrected to the rich side. Alternatively, the output air-fuel ratio of the downstream side air-fuel ratio sensor 41 may be corrected to the rich side. On the other hand, when the output air-fuel ratio of the downstream side air-fuel ratio sensor 41 does not become the lean judgment air-fuel ratio AFrefl or more but becomes only the rich judgment air-fuel ratio AFrefr or less, the target air-fuel ratio is corrected to the lean side. Alternatively, the output air-fuel ratio of the downstream side air-fuel ratio sensor 41 may be corrected to the lean side.

REFERENCE SIGNS LIST 1 engine body
5 combustion chamber
7 intake port
9 exhaust port
19 exhaust manifold
20 upstream direction exhaust purification catalyst
24 downstream side exhaust purification catalyst
31 ECU
40 upstream direction air-fuel ratio sensor
41 downstream side air-fuel ratio sensor

The invention claimed is:

1. An abnormality diagnosis system of an internal combustion engine wherein the internal combustion engine includes an exhaust purification catalyst which is arranged in an exhaust passage of the internal combustion engine and which can store oxygen, the abnormality diagnosis system comprising:
    an electronic control unit configured to control the air-fuel ratio of exhaust gas flowing into the exhaust purification catalyst to become a target air-fuel ratio, and
    a downstream side air-fuel ratio sensor which is arranged at a downstream side of said exhaust purification catalyst in an exhaust flow direction and which can detect an air-fuel ratio of exhaust gas discharged from said exhaust purification catalyst,
    wherein the electronic control unit is configured to perform an active air-fuel ratio control which alternately controls said target air-fuel ratio to a rich air-fuel ratio which is richer than a stoichiometric air-fuel ratio and a lean air-fuel ratio which is leaner than the stoichiometric air-fuel ratio at a given interval, and to diagnose abnormality of said exhaust purification catalyst based on an output air-fuel ratio of the downstream side air-fuel ratio sensor during execution of said active air-fuel ratio control,
    wherein the electronic control unit is configured to judge that said exhaust purification catalyst is abnormal when the output air-fuel ratio of the downstream side air-fuel ratio sensor becomes as rich as or richer than a rich judgment air-fuel ratio which is richer than the stoichiometric air-fuel ratio and becomes as lean as or leaner than a lean judgment air-fuel ratio which is leaner than the stoichiometric air-fuel ratio in a period where said target air-fuel ratio is successively made the rich air-fuel ratio and the lean air-fuel ratio due to said active air-fuel ratio control, and
    wherein the electronic control unit is configured to judge that the control of the air-fuel ratio is abnormal when the output air-fuel ratio of the downstream side air-fuel ratio sensor becomes only one of: (i) as rich as or richer than said rich judgment air-fuel ratio; and (ii) as lean as or leaner than said lean judgment air-fuel ratio, in the period where said target air-fuel ratio is successively made the rich air-fuel ratio and the lean air-fuel ratio due to said active air-fuel ratio control.

2. The abnormality diagnosis system of an internal combustion engine according to claim 1 wherein the electronic control unit is configured to judge that said exhaust purification catalyst is not abnormal when the output air-fuel ratio of the downstream side air-fuel ratio sensor is maintained in a range which is leaner than the rich judgment air-fuel ratio and richer than said lean judgment air-fuel ratio in the period where said target air-fuel ratio is successively made the rich air-fuel ratio and the lean air-fuel ratio due to said active air-fuel ratio control.

3. The abnormality diagnosis system of an internal combustion engine according to claim 1 wherein the electronic control unit is configured to suspend diagnosis of abnormality of said exhaust purification catalyst when it is judged that the control of the air-fuel ratio is abnormal.

4. The abnormality diagnosis system of an internal combustion engine according to claim 1 wherein the electronic control unit is configured to suspend said active air-fuel ratio control when it is judged that the control of the air-fuel ratio is abnormal.

5. The abnormality diagnosis system of an internal combustion engine according to claim 1 wherein the internal combustion engine further comprises an upstream direction air-fuel ratio sensor which is arranged at an upstream side of said exhaust purification catalyst in the exhaust flow direction and which can detect the air-fuel ratio of the exhaust gas flowing into the exhaust purification catalyst, and the electronic control unit is configured to calculate, based on an output air-fuel ratio of the upstream direction air-fuel ratio sensor, the amount of oxygen which is in excess or the amount of oxygen which becomes insufficient when trying to make the air-fuel ratio of the exhaust gas flowing into the exhaust purification catalyst the stoichiometric air-fuel ratio as an oxygen excess/shortage, and
    said given interval is an interval from when switching said target air-fuel ratio from the rich air-fuel ratio to the lean air-fuel ratio or from the lean air-fuel ratio to the rich air-fuel ratio to when an absolute value of the cumulative oxygen excess/shortage which is cumulatively added by the electronic control unit becomes a predetermined amount.

6. The abnormality diagnosis system of an internal combustion engine according to claim 5 wherein the electronic control unit is configured to correct said output air-fuel ratio of the upstream direction air-fuel ratio sensor or said target air-fuel ratio when said abnormality diagnosis system judges that the control of the air-fuel ratio is abnormal.

7. The abnormality diagnosis system of an internal combustion engine according to claim 6 wherein the electronic control unit is configured to correct the target air-fuel ratio or said output air-fuel ratio of the downstream side air-fuel ratio sensor to the lean side when the output air-fuel ratio of the downstream side air-fuel ratio sensor becomes only as rich as or richer than said rich judgment air-fuel ratio in the period where said target air-fuel ratio is successively made the rich air-fuel ratio and the lean air-fuel ratio due to said active air-fuel ratio control and to correct the target air-fuel ratio or said output air-fuel ratio of the downstream side air-fuel ratio sensor to the rich side when said output air-fuel ratio of the downstream side air-fuel ratio sensor becomes only as lean as or leaner than said lean judgment air-fuel ratio.

8. The abnormality diagnosis system of an internal combustion engine according to claim 6 wherein the electronic control unit is configured to correct said output air-fuel ratio of the upstream direction air-fuel ratio sensor or said target air-fuel ratio so that a difference becomes smaller between an absolute value of the cumulative oxygen excess/shortage which is cumulatively added by the electronic control unit from when said target air-fuel ratio is switched from the rich air-fuel ratio to the lean air-fuel ratio to when the target air-fuel ratio is again switched to the rich air-fuel ratio or to when said output air-fuel ratio of the downstream side air-fuel ratio sensor becomes as lean as or leaner than the lean judgment air-fuel ratio and the absolute value of the cumulative oxygen excess/shortage which is cumulatively added by the electronic control unit from when said target air-fuel ratio is switched from the lean air-fuel ratio to the rich air-fuel ratio to when said target air-fuel ratio is again switched to the lean air-fuel ratio or to when said output air-fuel ratio of the downstream side air-fuel ratio sensor becomes as rich as or richer than the rich judgment air-fuel ratio.

9. The abnormality diagnosis system of an internal combustion engine according to claim 1 wherein the downstream side air-fuel ratio sensor is a limit current type air-fuel ratio sensor.

10. The abnormality diagnosis system of an internal combustion engine according to claim 1, wherein the electronic control unit is configured to judge that said downstream side air-fuel ratio sensor is abnormal when the output air-fuel ratio of the downstream side air-fuel ratio sensor becomes only one of: (i) as rich as or richer than said rich judgment air-fuel ratio; and (ii) as lean as or leaner than said lean judgment air-fuel ratio, in the period where said target air-fuel ratio is successively made the rich air-fuel ratio and the lean air-fuel ratio due to said active air-fuel ratio control.

11. An abnormality diagnosis system of an internal combustion engine wherein the internal combustion engine includes an exhaust purification catalyst which is arranged in an exhaust passage of the internal combustion engine and which can store oxygen, the abnormality diagnosis system comprising:
an electronic control unit configured to control the air-fuel ratio of exhaust gas flowing into the exhaust purification catalyst to become a target air-fuel ratio, and
a downstream side air-fuel ratio sensor which is arranged at a downstream side of said exhaust purification catalyst in an exhaust flow direction and which can detect an air-fuel ratio of exhaust gas discharged from said exhaust purification catalyst,
wherein the electronic control unit is configured to perform an active air-fuel ratio control which alternately controls said target air-fuel ratio to a rich air-fuel ratio which is richer than a stoichiometric air-fuel ratio and a lean air-fuel ratio which is leaner than the stoichiometric air-fuel ratio at a given interval,
wherein the electronic control unit is configured to judge that the control of the air-fuel ratio is abnormal when an output air-fuel ratio of the downstream side air-fuel ratio sensor becomes only one of: (i) as rich as or richer than a rich judgment air-fuel ratio; and (ii) as lean as or leaner than a lean judgment air-fuel ratio, in a period where said target air-fuel ratio is successively made the rich air-fuel ratio and the lean air-fuel ratio due to said active air-fuel ratio control, wherein the rich judgment air-fuel ratio is richer than the stoichiometric air-fuel ratio, and wherein the lean judgment air-fuel ratio is leaner than the stoichiometric air-fuel ratio.

12. The abnormality diagnosis system of an internal combustion engine according to claim 11 wherein the electronic control unit is configured to suspend said active air-fuel ratio control when it is judged that the control of the air-fuel ratio is abnormal.

13. The abnormality diagnosis system of an internal combustion engine according to claim 11 wherein the internal combustion engine further comprises an upstream direction air-fuel ratio sensor which is arranged at an upstream side of said exhaust purification catalyst in the exhaust flow direction and which can detect the air-fuel ratio of the exhaust gas flowing into the exhaust purification catalyst, and the electronic control unit is configured to calculate, based on an output air-fuel ratio of the upstream direction air-fuel ratio sensor, the amount of oxygen which is in excess or the amount of oxygen which becomes insufficient when trying to make the air-fuel ratio of the exhaust gas flowing into the exhaust purification catalyst the stoichiometric air-fuel ratio as an oxygen excess/shortage, and
said given interval is an interval from when switching said target air-fuel ratio from the rich air-fuel ratio to the lean air-fuel ratio or from the lean air-fuel ratio to the rich air-fuel ratio to when an absolute value of the cumulative oxygen excess/shortage which is cumulatively added by the electronic control unit becomes a predetermined amount.

14. The abnormality diagnosis system of an internal combustion engine according to claim 13 wherein the electronic control unit is configured to correct said output air-fuel ratio of the upstream direction air-fuel ratio sensor or said target air-fuel ratio when said abnormality diagnosis system judges that the control of the air-fuel ratio is abnormal.

15. An electronic control unit for judging that control of an air-fuel ratio of an internal combustion engine is abnormal, wherein the electronic control unit is configured to:
control the air-fuel ratio of exhaust gas flowing into an exhaust purification catalyst to become a target air-fuel ratio;
perform an active air-fuel ratio control which alternately controls the target air-fuel ratio to a rich air-fuel ratio which is richer than a stoichiometric air-fuel ratio and a lean air-fuel ratio which is leaner than the stoichiometric air-fuel ratio at a given interval, and to diagnose abnormality of the exhaust purification catalyst based on an output air-fuel ratio of a downstream side air-fuel ratio sensor during execution of the active air-fuel ratio control;
judge that the exhaust purification catalyst is abnormal when the output air-fuel ratio of the downstream side air-fuel ratio sensor becomes as rich as or richer than a rich judgment air-fuel ratio which is richer than the stoichiometric air-fuel ratio and becomes as lean as or leaner than a lean judgment air-fuel ratio which is leaner than the stoichiometric air-fuel ratio in a period where the target air-fuel ratio is successively made the rich air-fuel ratio and the lean air-fuel ratio due to the active air-fuel ratio control, and
judge that the control of the air-fuel ratio is abnormal when the output air-fuel ratio of the downstream side air-fuel ratio sensor-becomes only one of: (i) as rich as or richer than the rich judgment air-fuel ratio; and (ii) as lean as or leaner than the lean judgment air-fuel ratio, in the period where the target air-fuel ratio is successively made the rich air-fuel ratio and the lean air-fuel ratio due to the active air-fuel ratio control.

16. The electronic control unit of claim 15 wherein the electronic control unit is configured to judge that the exhaust purification catalyst is not abnormal when the output air-fuel ratio of the downstream side air-fuel ratio sensor is maintained in a range which is leaner than the rich judgment air-fuel ratio and richer than the lean judgment air-fuel ratio in the period where the target air-fuel ratio is successively made the rich air-fuel ratio and the lean air-fuel ratio due to the active air-fuel ratio control.

17. The electronic control unit of claim 15 wherein the electronic control unit is configured to suspend diagnosis of abnormality of the exhaust purification catalyst when it is judged that the control of the air-fuel ratio is abnormal.

18. The electronic control unit of claim 15 wherein the electronic control unit is configured to suspend the active air-fuel ratio control when it is judged that the control of the air-fuel ratio is abnormal.

19. The electronic control unit of claim 15 wherein the electronic control unit is configured to calculate, based on an output air-fuel ratio of an upstream direction air-fuel ratio sensor, the amount of oxygen which is in excess or the amount of oxygen which becomes insufficient when trying to make the air-fuel ratio of the exhaust gas flowing into the exhaust purification catalyst the stoichiometric air-fuel ratio as an oxygen excess/shortage, and
the given interval is an interval from when switching the target air-fuel ratio from the rich air-fuel ratio to the lean air-fuel ratio or from the lean air-fuel ratio to the rich air-fuel ratio to when an absolute value of the cumulative oxygen excess/shortage which is cumulatively added by the electronic control unit becomes a predetermined amount.

20. The electronic control unit of claim 15 wherein the electronic control unit is configured to judge that the downstream side air-fuel ratio sensor is abnormal when the output air-fuel ratio of the downstream side air-fuel ratio sensor becomes only one of: (i) as rich as or richer than the rich judgment air-fuel ratio; and (ii) as lean as or leaner than the lean judgment air-fuel ratio, in the period where the target air-fuel ratio is successively made the rich air-fuel ratio and the lean air-fuel ratio due to the active air-fuel ratio control.

* * * * *